United States Patent
Kuroyanagi et al.

(10) Patent No.: US 11,362,561 B2
(45) Date of Patent: Jun. 14, 2022

(54) STATOR AND STATOR COIL HAVING LEAD WIRES ARRANGED TO SECURE INTERPHASE INSULATION PERFORMANCE

(71) Applicants: AISIN CORPORATION, Kariya (JP); HAYASHIKOGYOSYO CO., LTD., Nakatsugawa (JP)

(72) Inventors: Toru Kuroyanagi, Okazaki (JP); Takahiko Hobo, Nakatsugawa (JP); Hiroo Hayashi, Nakatsugawa (JP); Ko Kajita, Mizunami (JP)

(73) Assignees: AISIN CORPORATION, Kariya (JP); HAYASHI KOGYOSYO CO., LTD., Nakatsugawa (JP)

( * ) Notice: Subject to any disclaimer, the term of this patent is extended or adjusted under 35 U.S.C. 154(b) by 135 days.

(21) Appl. No.: 16/637,518

(22) PCT Filed: Sep. 19, 2018

(86) PCT No.: PCT/JP2018/034622
§ 371 (c)(1),
(2) Date: Feb. 7, 2020

(87) PCT Pub. No.: WO2019/059228
PCT Pub. Date: Mar. 28, 2019

(65) Prior Publication Data
US 2020/0220417 A1 Jul. 9, 2020

(30) Foreign Application Priority Data
Sep. 22, 2017 (JP) .............................. JP2017-182094

(51) Int. Cl.
*H02K 3/52* (2006.01)
*H02K 3/12* (2006.01)
(Continued)

(52) U.S. Cl.
CPC ............... *H02K 3/525* (2013.01); *H02K 3/12* (2013.01); *H02K 3/18* (2013.01); *H02K 3/345* (2013.01); *H02K 3/50* (2013.01)

(58) Field of Classification Search
CPC ............ H02K 3/12; H02K 3/18; H02K 3/325; H02K 3/345; H02K 3/50
(Continued)

(56) References Cited

U.S. PATENT DOCUMENTS

| 2002/0047449 A1 | 4/2002 | Kim et al. |
| 2007/0152531 A1* | 7/2007 | Santo ................... H02K 13/105 310/233 |

(Continued)

FOREIGN PATENT DOCUMENTS

| JP | 2002-44893 A | 2/2002 |
| JP | 2006-271050 A | 10/2006 |

(Continued)

OTHER PUBLICATIONS

Dec. 25, 2018 International Search Report issued in International Patent Application No. PCT/JP2018/034622.

*Primary Examiner* — Rashad H Johnson
(74) *Attorney, Agent, or Firm* — Oliff PLC

(57) ABSTRACT

A stator wherein the lead wire portion includes a root portion connected to the slot housed portion, disposed in a same-phase region which overlaps the coil end portion of the coil of a same phase as seen in the center axis direction, and disposed on an axially inner side with respect to the coil end portion, and a draw-out portion that projects in the center axis direction from a power source portion-side end portion of the root portion toward an axially outer side with respect to the coil end portion in the same-phase region.

12 Claims, 9 Drawing Sheets

(51) Int. Cl.
*H02K 3/18* (2006.01)
*H02K 3/34* (2006.01)
*H02K 3/50* (2006.01)

(58) Field of Classification Search
USPC .................................... 310/40 R, 179, 180
See application file for complete search history.

(56) References Cited

U.S. PATENT DOCUMENTS

2010/0295405 A1* 11/2010 Shikata ............... H02K 15/066
310/195
2020/0366172 A1* 11/2020 Kuroyanagi ........... H02K 3/345
2021/0175758 A1* 6/2021 Ayukawa .............. H02K 3/522

FOREIGN PATENT DOCUMENTS

JP 2013-123373 A 6/2013
JP 2014-131428 A 7/2014

* cited by examiner

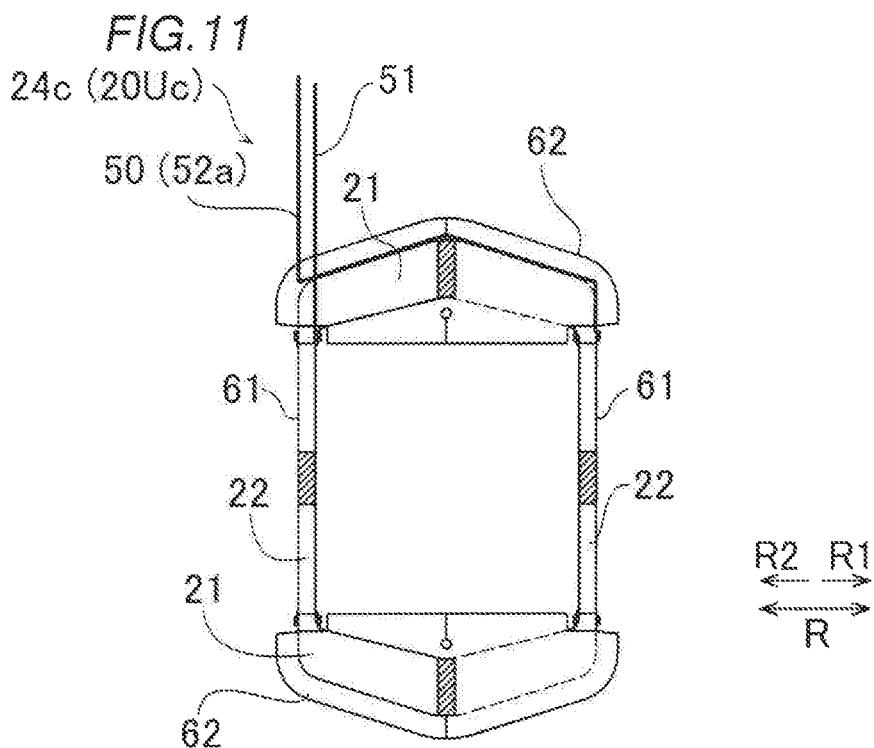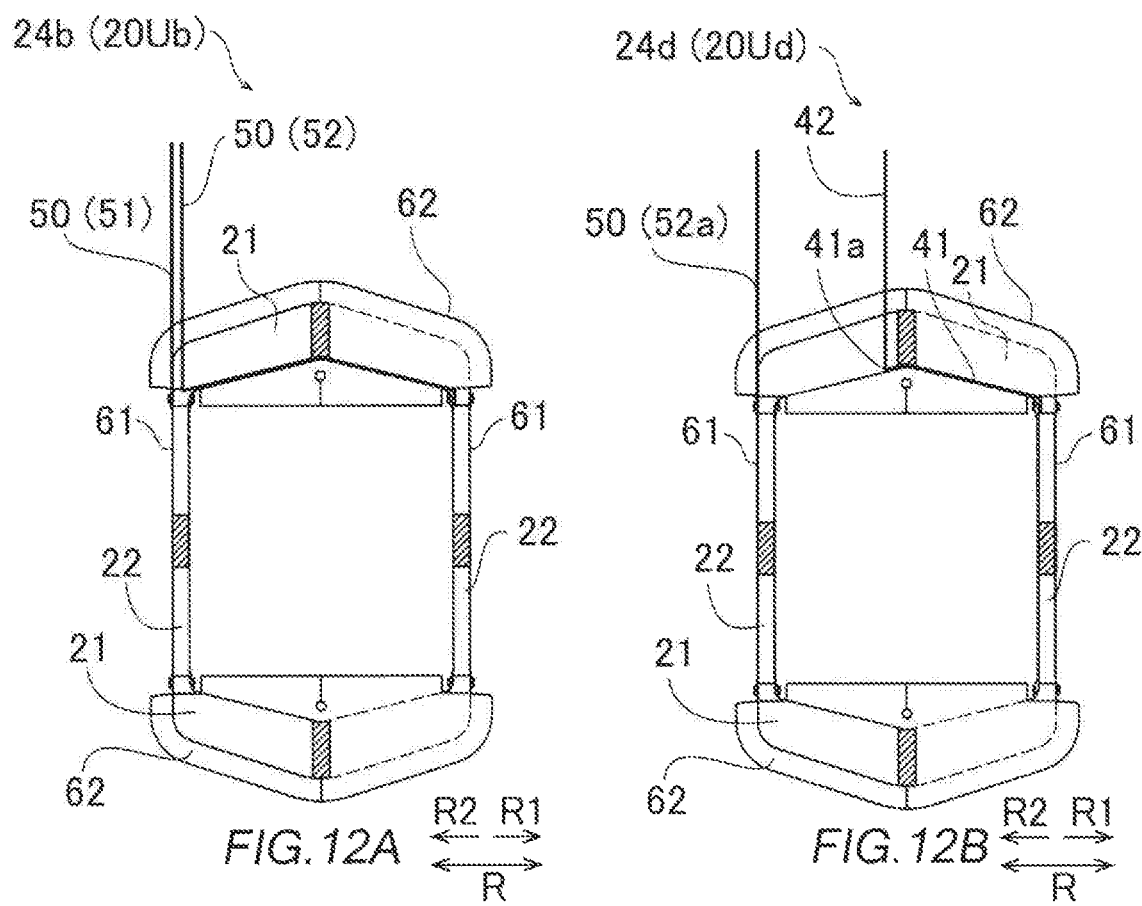

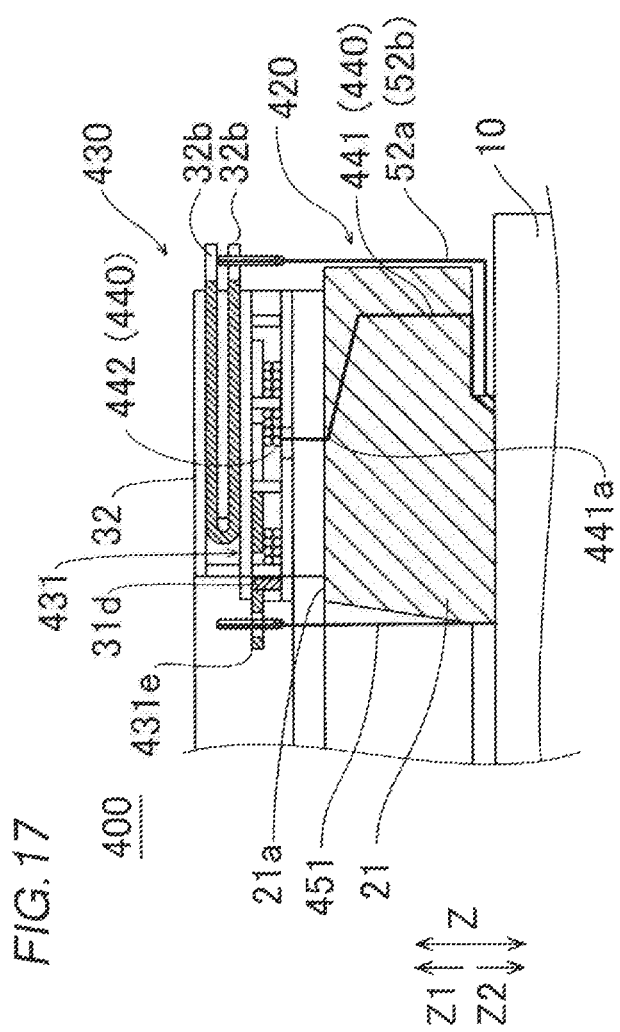

STATOR AND STATOR COIL HAVING LEAD WIRES ARRANGED TO SECURE INTERPHASE INSULATION PERFORMANCE

BACKGROUND

The present disclosure relates to a stator and a stator coil.

There have hitherto been known a stator that includes coils that have respective lead wire portions and a stator coil that has a lead wire. Such a stator and a stator coil are disclosed in Japanese Patent Application Publication No. 2006-271050 (JP 2006-271050 A), for example.

Japanese Patent Application Publication No. 2006-271050 (JP 2006-271050 A) discloses a stator for a brushless motor. The stator has routed wires (lead wires) routed from power source terminals to coils. The stator is provided with a plurality of coils. The plurality of coils are connected to a power source via the routed wires and the power source terminals, and connected through a 3-phase Y connection. In addition, the plurality of coils are provided with respective routed wires. The routed wires are each disposed in contact with a coil of a phase that is different from the phase of the routed wire itself. The plurality of routed wires are each provided with an insulating tube formed from a resin material, in order to secure insulation from the coils of phases that are different from the phase of the routed wire itself.

SUMMARY

In the stator described in Japanese Patent Application Publication No. 2006-271050 (JP 2006-271050 A), the plurality of routed wires are each provided with an insulating tube, in order to secure insulation (interphase insulation performance) from the coils of phases that are different from the phase of the routed wire itself. Therefore, it is necessary to attach the insulating tube to each of the routed wires (lead wire portions), which increases the time (number of man-hours for manufacture) required to manufacture the stator. In the stator described in Japanese Patent Application Publication No. 2006-271050 (JP 2006-271050 A), since the insulating tube is attached to each of the routed wires, the length of coil end portions in the axial direction is increased because of the thickness of the insulating tube. Thus, in the stator described in Japanese Patent Application Publication No. 2006-271050 (JP 2006-271050 A), the number of man-hours for manufacture of the stator is increased, and the length of the coil end portions in the axial direction is increased, in order to secure the interphase insulation performance of the routed wires (lead wire portions).

An exemplary aspect of the disclosure provides a stator and a stator coil that can prevent an increase in the number of man-hours for manufacture of the stator and prevent an increase in the length of coil end portions in the axial direction while securing the interphase insulation performance of lead wire portions.

A first aspect of the present disclosure provides a stator including: a stator core; and a plurality of coils that each include a coil end portion that projects from an end surface of the stator core in a center axis direction, a slot housed portion disposed in a plurality of slots of the stator core, and a lead wire portion that connects between the slot housed portion and a power source portion, in which the lead wire portion includes a root portion connected to the slot housed portion, disposed in a same-phase region which overlaps the coil end portion of the coil of a same phase as seen in the center axis direction, and disposed on an axially inner side with respect to the coil end portion, and a draw-out portion that projects in the center axis direction from a power source portion-side end portion of the root portion toward an axially outer side with respect to the coil end portion in the same-phase region. The wording "project in the center axis direction" as used herein not only means projecting in a direction that is parallel to the center axis direction and projecting along the center axis direction, but also means a broad concept that the projecting direction is a "direction that simply includes a center axis-direction component". In addition, the term "same-phase region" not only means a position overlapping the coil end portion of a predetermined coil, among the plurality of coils that the root portion overlaps, but also means a broad concept including a position overlapping the coil end portions of all the coils of the same phase, among the plurality of coils, and the boundary portion between the coil end portions of the coils of the same phase.

Here, in general, in the case where the lead wire portion is routed to a desired position (e.g. the position of a wiring holding member for routing), the lead wire portion is first drawn out from the slot housed portion toward the radially outer side or the radially inner side of the stator core. The lead wire portion which has been drawn out is routed along the outer surface of a coil end portion, whether the coil end portion is of the same phase as or a different phase from the phase of the lead wire portion itself. In this case, the lead wire portion may contact the coil end portion of a different phase, which may make it difficult to secure the interphase insulation performance. In the stator according to the first aspect of the present disclosure, as described above, the root portion of the lead wire portion is connected to the slot housed portion, and disposed in the same-phase region which overlaps the coil end portion of the coil of the same phase as seen in the center axis direction, and the draw-out portion of the lead wire portion is disposed so as to project in the center axis direction from the power source portion-side end portion of the root portion toward the axially outer side with respect to the coil end portion in the same-phase region. Consequently, the lead wire portion can be routed at a position (in the same-phase region) overlapping the coil end portion of the coil of the same phase from the root portion to the draw-out portion of the lead wire portion. Thus, the lead wire portion can be routed so as not to contact coils (coil end portions) of different phases even in the case where the lead wire portion is routed to a desired position (on the outer side of the coil end portion). As a result, it is no longer necessary to provide the lead wire portion with an insulating tube. Thus, it is possible to prevent an increase in the number of man-hours for manufacture of the stator, and to prevent an increase in the length of the coil end portions in the axial direction, while securing the interphase insulation performance of the lead wire portions.

A second aspect of the present disclosure provides a stator coil including: a coil end portion that projects from an end surface of a stator core in a center axis direction; a slot housed portion disposed in a plurality of slots of the stator core; and a lead wire portion that connects between the slot housed portion and a power source portion, in which the lead wire portion includes a root portion connected to the slot housed portion, disposed in a same-phase region which overlaps the coil end portion of the coil of a same phase as seen in the center axis direction, and disposed on an axially inner side with respect to the coil end portion, and a draw-out portion that projects in the center axis direction from a power source portion-side end portion of the root portion toward an axially outer side with respect to the coil end portion of the coil of the same phase in the same-phase region.

With the stator coil according to the second aspect of the present disclosure configured as described above, it is possible to provide a stator coil that can prevent an increase in the number of man-hours for manufacture of the stator, and to prevent an increase in the length of the coil end portions in the axial direction, while securing the interphase insulation performance of the lead wire portions.

According to the present disclosure, as described above, it is possible to prevent an increase in the number of man-hours for manufacture of the stator, and to prevent an increase in the length of the coil end portions in the axial direction, while securing the interphase insulation performance of the lead wire portions.

BRIEF DESCRIPTION OF THE DRAWINGS

FIG. 11 illustrates the configuration of the third coaxially wound coil according to the embodiment of the present disclosure.

FIGS. 12A and 12B illustrate the configuration of the second coaxially wound coil (FIG. 12A) and the fourth coaxially wound coil (FIG. 12B) according to the embodiment of the present disclosure.

FIG. 17 is a sectional view illustrating the configuration of a stator (a lead wire portion and a wiring holding member) according to a second modification of the embodiment of the present disclosure.

DETAILED DESCRIPTION OF EMBODIMENTS

An embodiment of the present disclosure will be described below with reference to the drawings.

First Embodiment (Configuration of Stator)

The structure of a stator 100 according to a first embodiment will be described with reference to FIGS. 1 to 14. The stator 100 constitutes a part of a rotary electric machine (a motor, a generator, or a motor generator). For example, a rotor (not illustrated) is disposed on the radially inner side of the stator 100. The term "axial direction (center axis direction)" as used herein means the direction (Z direction) of a center axis C1 of the stator 100. The term "radial direction" means the radial direction (R direction) of the stator 100. The term "circumferential direction" means the circumferential direction of the stator 100.

Figure 1:
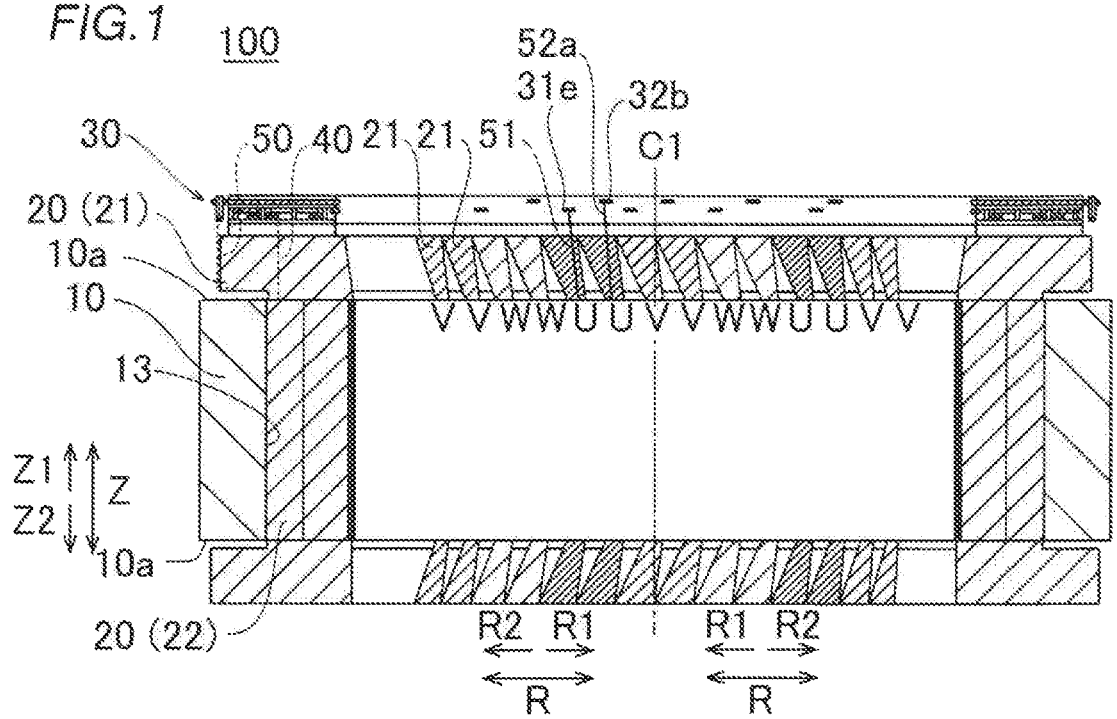
FIG. 1 is a sectional view of a stator according to an embodiment of the present disclosure.

As illustrated in FIG. 1, the stator 100 includes a stator core 10, stator coils 20 (hereinafter referred to as "coils 20"), and a wiring holding member 30. In addition, the coils 20 each include a lead wire portion 40 connected to a power source portion 200 (see FIG. 3) and a neutral point-side wire portion 50 connected to a neutral point N (see FIG. 3). The lead wire portion 40 and the neutral point-side wire portion 50 are held by the wiring holding member 30.

Figure 2:
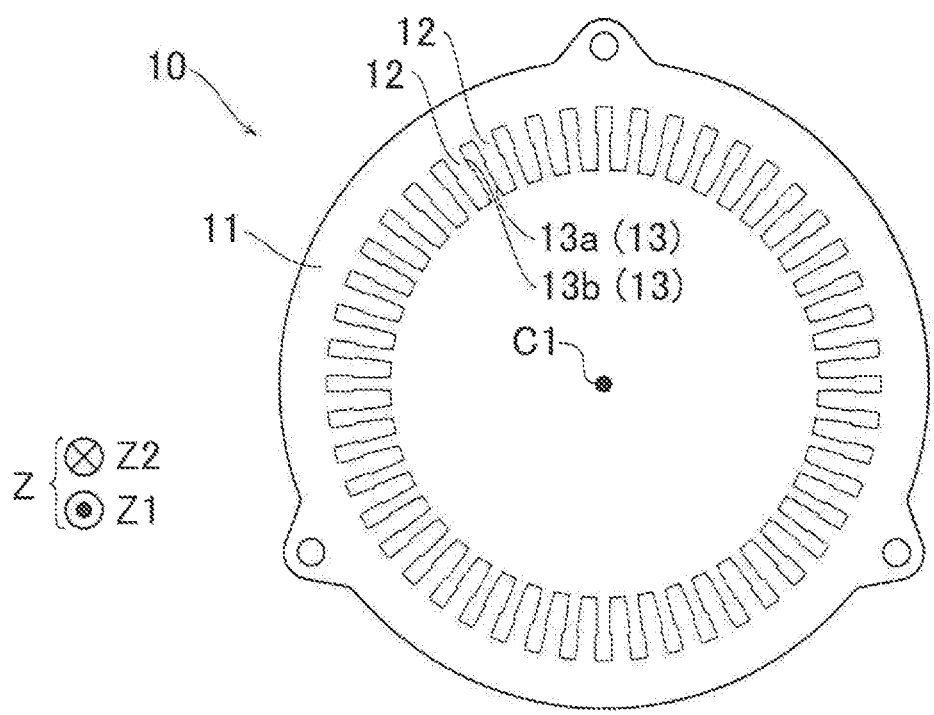
FIG. 2 is a plan view of a stator core according to the embodiment of the present disclosure.

As illustrated in FIG. 2, the stator core 10 is provided with an annular back yoke 11 and a plurality of teeth 12 projecting radially inward from the back yoke 11 and provided at equal angular intervals. Slots 13 are formed between the adjacent teeth 12. The slots 13 each include a radially inner slot 13a provided on the radially inner side and a radially outer slot 13b provided on the radially outer side. Different coils are disposed in the radially inner slot 13a and the radially outer slot 13b. That is, the coils 20 (coaxially wound coils) are each constituted as a two-layer distributed wound coil (see FIG. 4) disposed over the plurality of teeth 12 which constitute the slots 13, disposed together with a different coil 20 (a coaxially wound coil of the same phase or a coaxially wound coil of a different phase) in the same slot 13, and disposed adjacent to the different coil 20 (different coaxially wound coil) in the radial direction.

(Configuration of Coil)

As illustrated in FIG. 1, the coils 20 each include coil end portions 21 that project from end surfaces 10a of the stator core 10 in the direction of the center axis C1, and slot housed portions 22 disposed in the slots 13 of the stator core 10.

Figure 3:
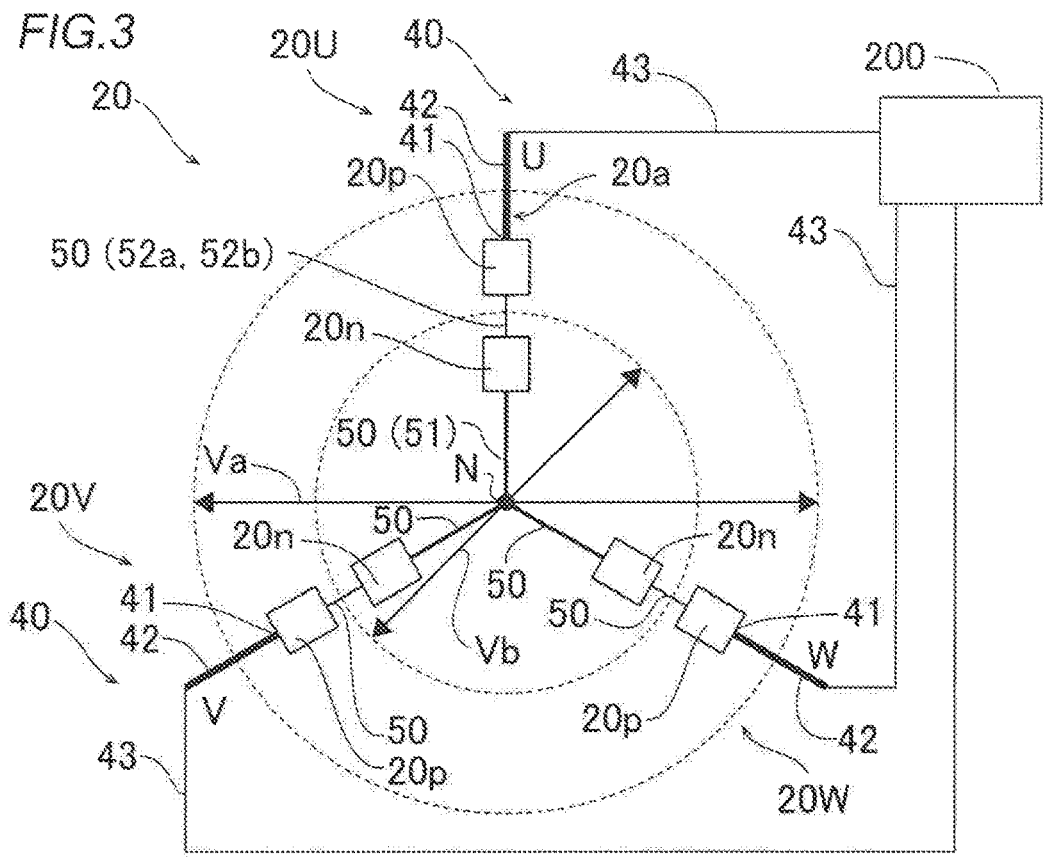
FIG. 3 is a schematic diagram illustrating a connection of stator coils according to the embodiment of the present disclosure.

As illustrated in FIG. 3, the coils 20 are configured to be supplied with three-phase AC power from the power source portion 200. For example, the coils 20 include U-phase coils 20U which are coils 20 supplied with U-phase power from the power source portion 200, V-phase coils 20V which are coils 20 supplied with V-phase power from the power source portion 200, and W-phase coils 20W supplied with W-phase power from the power source portion 200. The coils 20 are connected such that eight coils 20 are connected in parallel and two coils 20 are connected in series for each phase, and connected through a Y connection, for example. Forty-eight coils 20 are provided, for example. In FIG. 3, the coils 20 which are connected in parallel are not illustrated. In addition, the U-phase coils 20U, the V-phase coils 20V, and the W-phase coils 20W are formed similarly, and will be described as the coils 20 below unless specifically differentiated.

Of the two coils 20 which are connected in series, the coil 20 on the power source portion 200 side is defined as a power source portion-side coil 20p, and the coil 20 on the neutral point N side is defined as a neutral point-side coil 20n. The lead wire portion 40 on the power source portion 200 side of the power source portion-side coil 20p is connected to the power source portion 200. The neutral point-side wire portion 50 (neutral point connection wire portion 51) on the neutral point N side of the neutral point-side coil 20n is connected to the neutral point N. The neutral point-side wire portion 50 (distant pole wire portion 52a) of the power source portion-side coil 20p and a distant pole wire portion 52b provided on the power source portion 200 side of the neutral point-side coil 20n are connected to each other via a distant pole wiring member 32 to be discussed later. In the following description, the power source portion-side coil 20p and the neutral point-side coil 20n will be described as the coils 20 unless specifically differentiated.

Here, as illustrated in FIG. 3, the potential difference between the lead wire portions 40 of different phases is Va. The maximum value of the potential difference Va is a voltage value obtained by superimposing a surge voltage of the power source portion 200 (power conversion device: inverter device) on the maximum interphase distributed voltage, for example. In addition, the potential difference between the neutral point-side wire portions 50 is Vb. The potential difference Vb is a voltage value of about three-fourths of the maximum interphase distributed voltage, for example. Here, a conductor 20a (e.g. a round wire with a cross section in a perfect circle shape) which constitutes the coils 20 is coated with an insulation coating with a withstanding voltage that is more than the potential difference Vb and that is less than the potential difference Va. Consequently, the insulation between the coils 20, other than the lead wire portions 40 of different phases, is secured while suppressing a reduction in the coil space factor due to the insulation coating being too thick.

Figure 4:
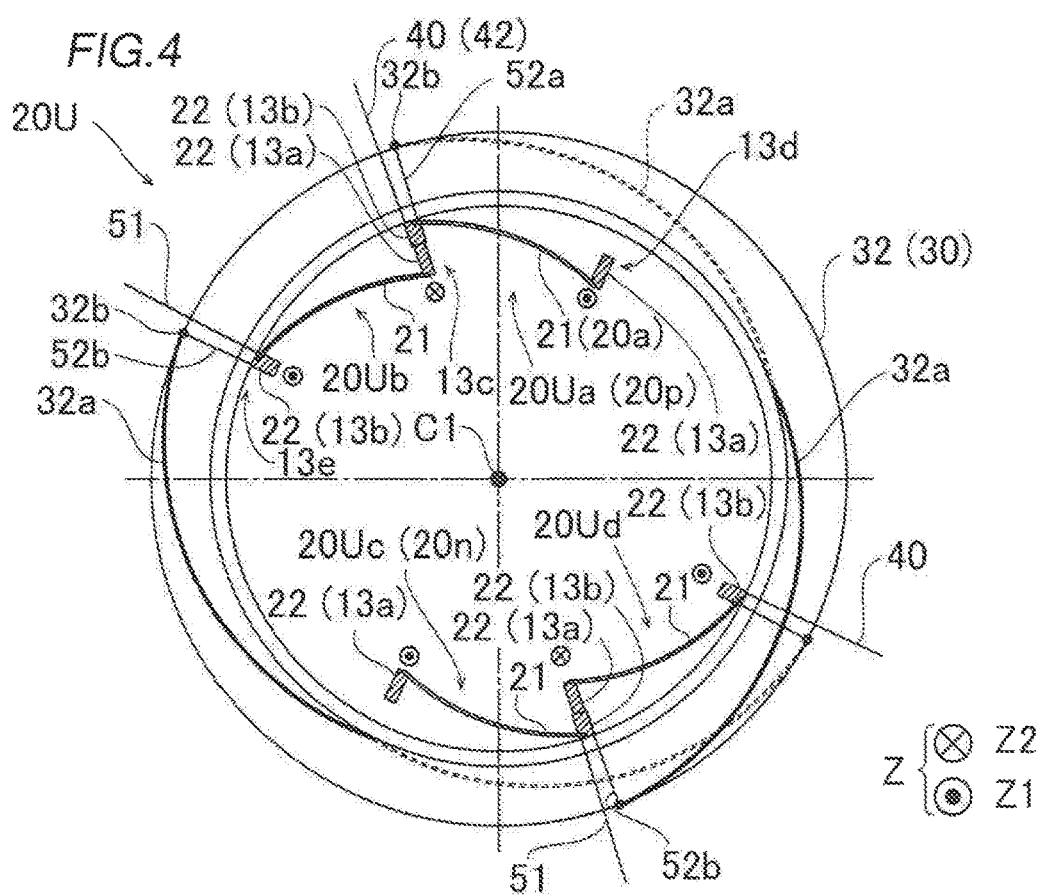
FIG. 4 illustrates distant pole wiring of the stator coils according to the embodiment of the present disclosure.
Figure 5:
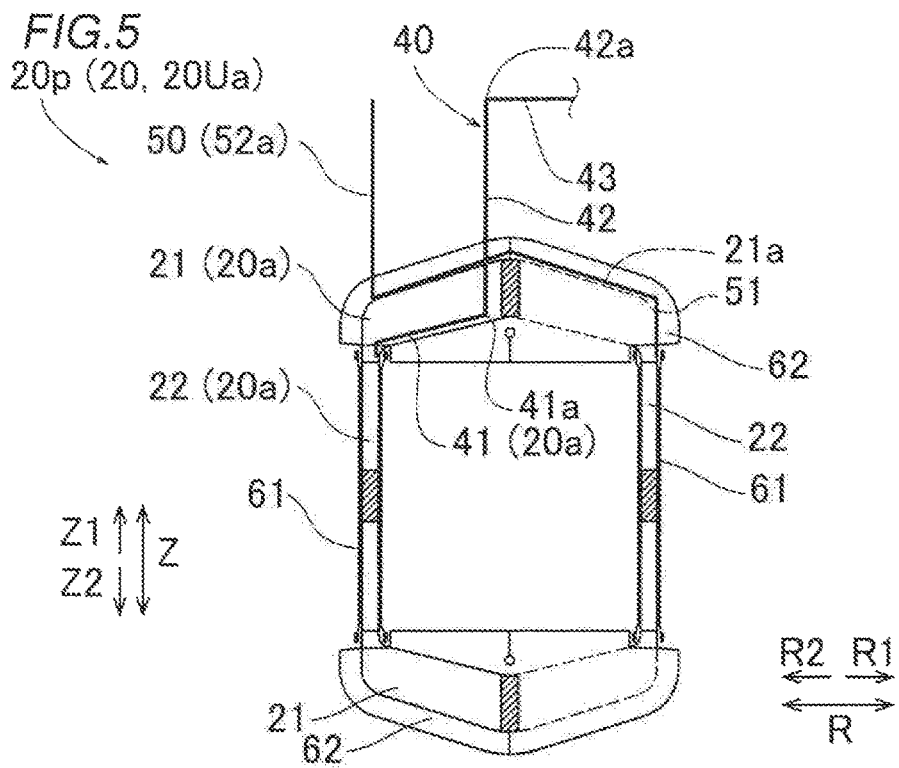
FIG. 5 illustrates the configuration of a first coaxially wound coil according to the embodiment of the present disclosure.

As illustrated in FIGS. 4 and 5, the coils 20 are each a coaxially wound coil (see FIG. 5) formed by winding the conductor 20a a plurality of times in a first slot 13c, of the plurality of slots 13, and a second slot 13d disposed away from the first slot 13c in the circumferential direction of the stator core 10. The first slot 13c is an example of the "first slot." In addition, the second slot 13d is an example of the "second slot."

FIG. 4 schematically illustrates some (two in parallel, two in series) of the U-phase coils 20U, among the plurality of coils 20 (eight in parallel, two in series). A plurality of (e.g. five) slots 13 are provided between the first slot 13c and the second slot 13d in the circumferential direction. A first U-phase coil 20Ua is disposed in the radially outer slot 13b of the first slot 13c and the radially inner slot 13a of the second slot 13d. In addition, a second U-phase coil 20Ub is disposed in the radially inner slot 13a of the first slot 13c and the radially outer slot 13b of a third slot 13e. The first U-phase coil 20Ua and the second U-phase coil 20Ub are connected in parallel with each other.

A third U-phase coil 20Uc, which is connected in series with the first U-phase coil 20Ua, is positioned generally point-symmetrically to the first U-phase coil 20Ua with respect to the center axis C1 of the stator core 10 as seen in the axial direction, for example. That is, the first U-phase coil 20Ua and the third U-phase coil 20Uc are connected to each other as distant poles (through distant pole wiring) to serve as the power source portion-side coil 20p and the neutral point-side coil 20n, respectively. The first U-phase coil 20Ua and the third U-phase coil 20Uc are connected to each other through the distant pole wire portions 52a and 52b of the neutral point-side wire portion 50 and a connection wiring portion 32a of the distant pole wiring member 32 to be discussed later. The neutral point-side wire portion 50 (distant pole wire portions 52a and 52b) and the connection wiring portion 32a function as a crossover wire between the power source portion-side coil 20p and the neutral point-side coil 20n.

Meanwhile, the second U-phase coil 20Ub and a fourth U-phase coil 20Ud, which is connected in series with the second U-phase coil 20Ub, are connected to each other through the distant pole wire portions 52a and 52b and the connection wiring portion 32a, as with the connection between the first U-phase coil 20Ua and the third U-phase coil 20Uc. In addition, the second U-phase coil 20Ub and the fourth U-phase coil 20Ud are connected to each other as distant poles to serve as the neutral point-side coil 20n and the power source portion-side coil 20p, respectively.

Figure 6:
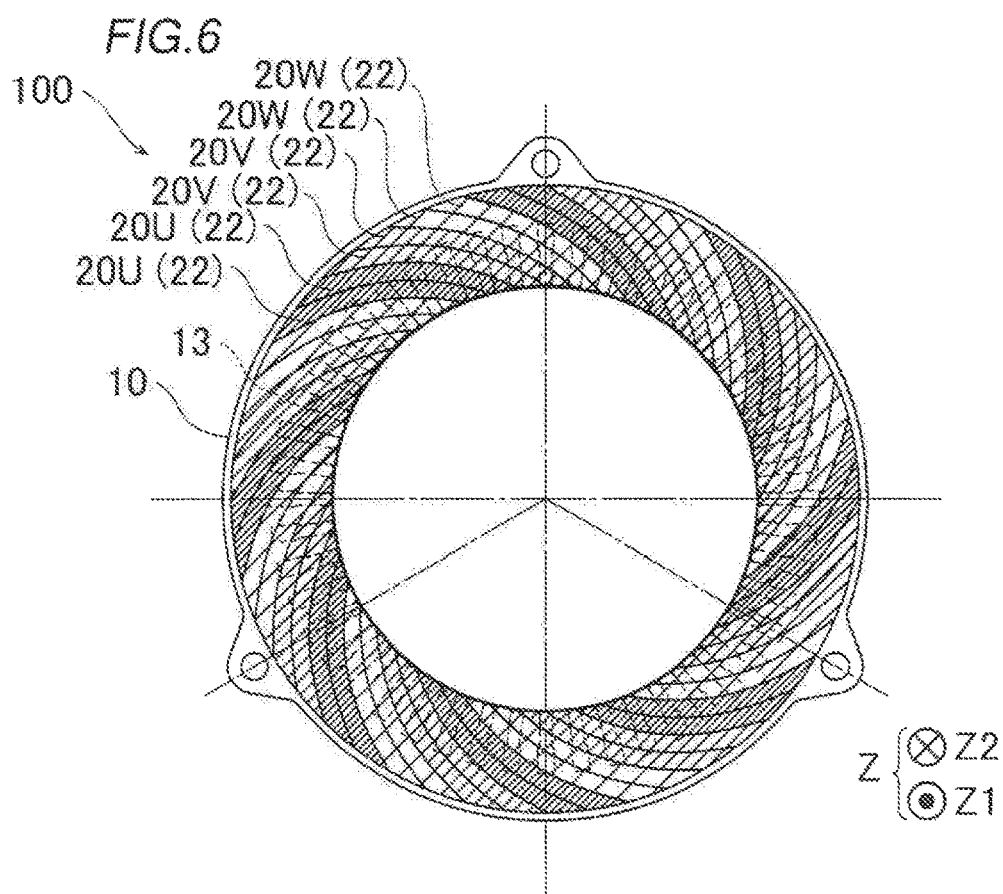
FIG. 6 is a plan view schematically illustrating the configuration of coil end portions according to the embodiment of the present disclosure.

In the first embodiment, as illustrated in FIGS. 1 and 6, the coils 20 are each disposed adjacent to a different coil 20 of the same phase. For example, coils 20 of different phases are provided every two slots that are adjacent in the circumferential direction. Specifically, in the stator 100, coil end portions 21 of different phases are adjacent in the radial direction, and adjacent in the circumferential direction. That is, the coils 20 are disposed in the order of U, U, V, V, W, and W in the circumferential direction. Consequently, the coil end portions 21 are disposed in the order of U, U, V, V, W, and W in the circumferential direction.

As illustrated in FIG. 5, a pair of slot housed portions 22 are provided, and formed to extend straight along the axial direction. The coil end portions 21 are configured to connect the pair of slot housed portions 22 on the arrow Z1 direction side and the arrow Z2 direction side. In addition, slot insulating paper 61 is disposed between the slot housed portions 22 and the slots 13. The slot insulating paper 61 secures the insulation performance between the slot housed portions 22 and the stator core 10. Meanwhile, interphase insulating paper 62 is disposed on the side surfaces of the coil end portions 21 in the circumferential direction. The interphase insulating paper 62 secures the interphase insulation performance between the coil end portions 21 and the coil end portions 21 of different phases (other phases).

<Configuration of Lead Wire Portion>

Figure 7:
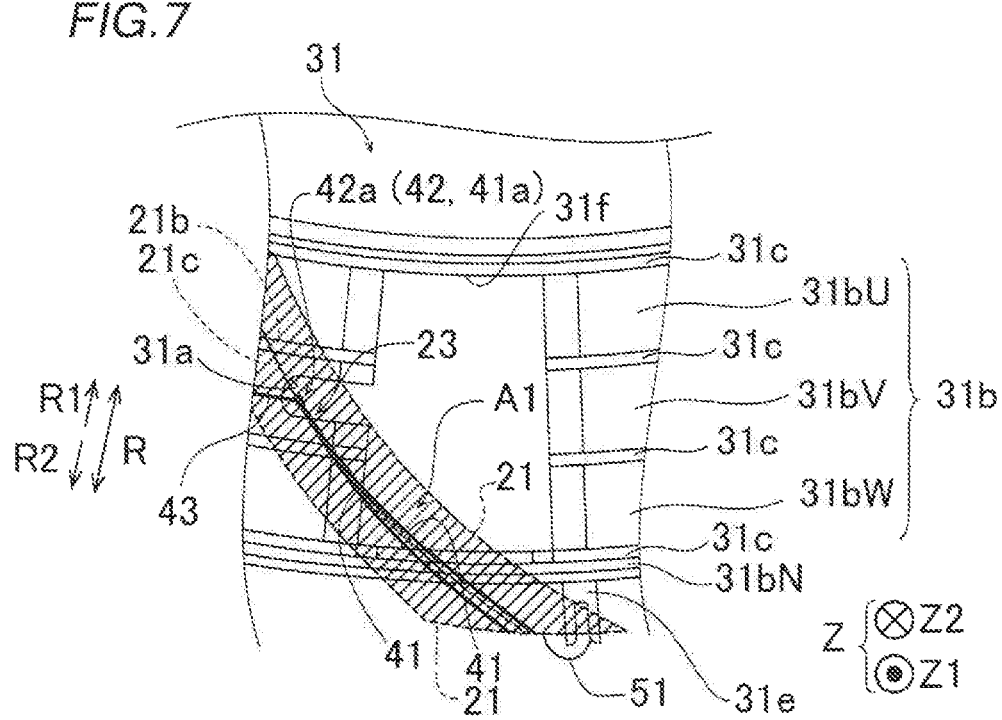
FIG. 7 is a plan view illustrating the configuration of a lead wire portion and a take-in port according to the embodiment of the present disclosure.

In the first embodiment, as illustrated in FIG. 5, the lead wire portion 40 of the coil 20 (power source portion-side coil 20p) includes: a root portion 41 connected to the slot housed portion 22, disposed in a same-phase region A1 (e.g. a hatched region in FIG. 7) which overlaps the coil end portion 21 of the coil 20 of the same phase as seen in the direction of the center axis C1 (direction of the arrow Z2) as illustrated in FIG. 7, and disposed on the axially inner side with respect to the coil end portion 21; and a draw-out portion 42 disposed so as to project in the Z direction from an end portion 41a of the root portion 41 on the power source portion side toward the axially outer side (the arrow Z1 direction side) with respect to the coil end portion 21 in the same-phase region A1. The end portion 41a is an example of the "power source portion-side end portion of the root portion." The wording "project in the Z direction" as used herein not only means projecting in a direction that is parallel to the Z direction and projecting along the Z direction, but also means a broad concept that the projecting direction is a "direction that simply includes a Z-direction component". In addition, the wording "overlap the coil end portion 21" means being disposed inside a region in which the coil end portion 21 of the same phase is disposed in the radial direction and the circumferential direction.

In the first embodiment, particularly, as illustrated in FIG. 5, the root portion 41 is disposed on the inner peripheral side (winding inner side) with respect to an outermost conductor 21a at the outermost periphery of the coil end portion 21 of the coil 20 which is a coaxially wound coil of the same phase which is wound to have the slot housed portion 22 and the coil end portion 21. More preferably, the root portion 41 is disposed at the winding innermost periphery (including the substantially innermost periphery) of the coil end portion 21 of the coil 20, which is a coaxially wound coil, of the root portion 41 itself. The term "winding inner side" means a region near the region surrounded by the coil end portion 21 and the slot housed portion 22. The substantially innermost periphery is not necessarily limited to a case where the root portion 41 is provided on the inner side with respect to all the other conductors, and it is only necessary that the root portion 41 should be a conductor 20a that constitutes the first winding (first winding on the start side) of the coaxially wound coil. The term "coil of the root portion 41 itself" means the coil 20 which is formed as a coaxially wound coil from the conductor 20a which is continuous with the relevant lead wire portion 40. The term "coil of the same phase" is not limited to the "coil of the root portion 41 itself", and used to include an "adjacent coil" to be discussed later and include all the coils 20 (see FIG. 6) of the same phase as the relevant lead wire portion 40.

As illustrated in FIG. 7, the root portion 41 is disposed in the same-phase region A1 which overlaps the coil end portion 21 of the coil 20 of the same phase as seen in the direction of the arrow Z2. Preferably, the root portion 41 is disposed at a position overlapping the coil end portion 21 of the coil 20 of the root portion 41 itself in the same-phase region A1. For example, the root portion 41 is disposed along the arcuate shape of the coil end portion 21 of the coil 20 of the root portion 41 itself from the radially outer side as seen in the direction of the arrow Z2. Particularly, the root portion 41 is disposed along a boundary portion 23 which is a gap between a side surface 21b and a side surface 21c of the respective coil end portions 21 of the coils 20 which are adjacent to each other and a region in the vicinity of the side surface 21b and the side surface 21c, and the end portion 41a of the root portion 41 on the power source portion 200 side is disposed at the boundary portion 23. The term "same-phase region A1" not only means a position overlapping the coil end portion 21 of a predetermined coil 20 (e.g. the coil 20 of the root portion 41 itself), among the plurality of coils 20 that the root portion 41 overlaps, but also means a broad concept including a position overlapping the coil end portions 21 of all the coils 20 of the same phase, among the plurality of coils 20, and the boundary portion 23 between the coil end portions 21 of the coils 20 of the same phase.

The draw-out portion 42 is disposed so as to project in the direction of the center axis C1 (Z direction) from the end portion 41a of the root portion 41 on the power source portion 200 side toward the axially outer side with respect to the coil end portion 21, so as to intersect the coil end portion 21 of the coil 20 of the same phase (of the draw-out portion 42 itself) in the same-phase region A1. The term "end portion" as used herein means an end portion of a predetermined portion, and includes portions which are formed to be continuous with each other. That is, the end portion 41a of the root portion 41 and the draw-out portion 42 are formed to be continuous with each other through the conductor 20a.

In the first embodiment, as illustrated in FIG. 7, the draw-out portion 42 is disposed so as to project in the direction of the center axis C1 from the end portion 41a of the root portion 41 on the power source portion 200 side toward the axially outer side with respect to the coil end portion 21 (see FIG. 5) at a position (in the same-phase region A1) overlapping the coil end portion 21 of the coil 20 of the same phase as seen in the direction of the center axis C1 (direction of the arrow Z2). Particularly, since the end portion 41a of the root portion 41 on the power source portion side is disposed in the same-phase region A1 in which the coil end portion 21 of the same phase is disposed in the radial direction and the circumferential direction, the end portion 41a is disposed at a position overlapping the coil end portion 21 of the coil 20 of the lead wire portion 40 itself as seen in the axial direction.

For example, the draw-out portion 42 extends along the Z direction upward in the axial direction (in the direction away from the stator core 10) from the end portion 41a as illustrated in FIG. 5, to be disposed on the axially outer side with respect to the coil end portion 21 and drawn out from the coil end portion 21. The draw-out portion 42 is formed to extend straight, for example.

In the first embodiment, in addition, the draw-out portion 42 is disposed so as to project in the Z direction from the end portion 41a of the root portion 41 toward the axially outer side with respect to the coil end portion 21 at a position (in the same-phase region A1) overlapping the coil end portion 21 of the coil 20 of the draw-out portion 42 itself or the coil end portion of the adjacent coil 20 as seen in the direction of the arrow Z2. Particularly, as illustrated in FIG. 7, the draw-out portion 42 is disposed so as to project along the Z direction from the end portion 41a of the root portion 41 toward the axially outer side with respect to the coil end portion 21 via the boundary portion 23 in the circumferential direction between the coil end portion 21 of the coil 20 of the draw-out portion 42 itself and the coil end portion 21 of the adjacent coil 20 of the same phase. That is, the position overlapping the coil end portion 21 of the coil 20 of the draw-out portion 42 itself or the coil end portion 21 of the adjacent coil 20 in the same-phase region A1 includes the boundary portion 23.

More particularly, the side surface 21b, on one side in the circumferential direction, of a first coil end portion 21 and the side surface 21c, on the other side in the circumferential direction, of a second coil end portion 21 that is adjacent to the first coil end portion 21 are disposed in proximity to (in contact with) each other as seen in the direction of the arrow Z2. The boundary portion 23 is a gap between the side surface 21b and the side surface 21c of the coil end portions 21 of the same phase and a region in the vicinity of the side surface 21b and the side surface 21c. The draw-out portion 42 and the root portion 41 of the lead wire portion 40 associated with the first coil end portion 21 and the draw-out portion 42 and the root portion 41 of the lead wire portion 40 associated with the second coil end portion 21 are formed (routed) so as to extend in the axial direction when such portions are disposed at the boundary portion 23.

Figure 8:
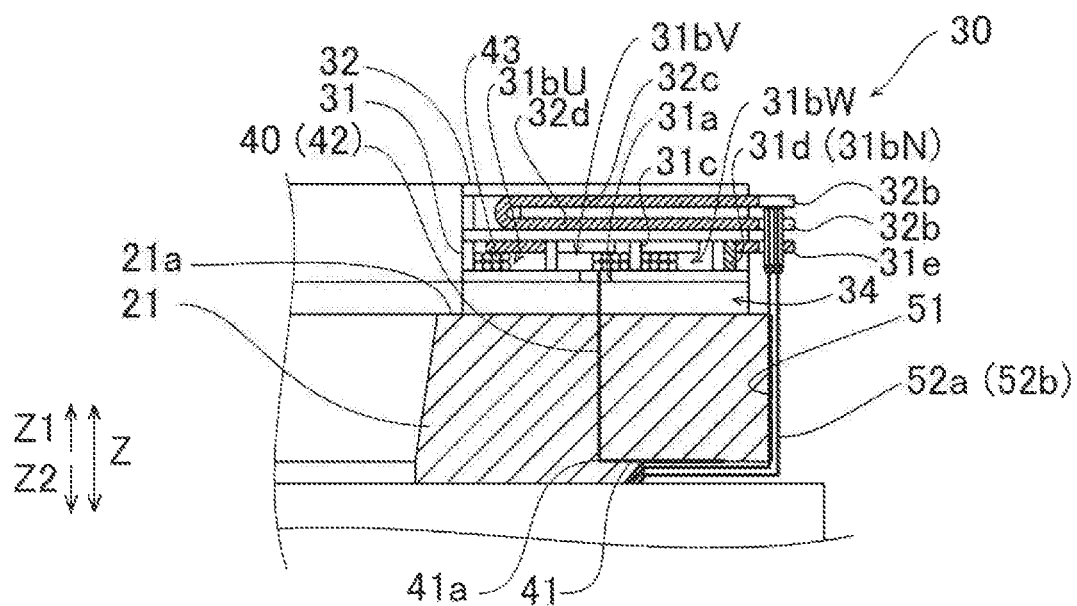
FIG. 8 is a sectional view illustrating the configuration of a wiring holding member according to the embodiment of the present disclosure.

As illustrated in FIGS. 7 and 8, in addition, the draw-out portion 42 of the lead wire portion 40 is configured to be guided to a lead wire portion holding member 31, to be discussed later, of the wiring holding member 30 via a take-in port 31a. The end portion 41a of the root portion 41 is disposed at a position at which the circumferential position and the radial position thereof are generally the same as those of the take-in port 31a of the lead wire portion holding member 31, to be discussed later, of the wiring holding member 30. In other words, the take-in port 31a is disposed at a position (in the same-phase region A1) overlapping the coil end portion 21 of the same phase as the draw-out portion 42 to be guided as seen in the direction of the arrow Z2. It is only necessary that a part of the take-in port 31a should be disposed in the same-phase region A1, and it is not necessary that the entirety of the take-in port 31a should be disposed in the same-phase region A1.

Here, in the first embodiment, the lead wire portion 40 includes a routed portion 43 connected to an end portion 42a of the draw-out portion 42 on the power source portion 200 side and routed on the outer side with respect to the coil end portion 21 in the direction of the center axis C1. Specifically, the end portion 42a of the draw-out portion 42 of the lead wire portion 40 is taken in from the take-in port 31a of the wiring holding member 30 to be guided into the wiring holding member 30 to be disposed in the wiring holding member 30. The routed portion 43 is disposed in the lead wire portion holding member 31, to be discussed later, from the end portion 42a, and connected to the power source portion 200 via a power source terminal etc. In other words, in the first embodiment, the draw-out portion 42 is disposed at a position overlapping the coil end portion 21 of the coil 20 of the same phase (preferably the coil 20 of the draw-out portion 42 itself) from the end portion 41a of the root portion 41 on the power source portion 200 side to the end portion 42a of the draw-out portion 42 on the power source portion 200 side, which is connected to the routed portion 43, as seen in the axial direction in the same-phase region A1.

<Configuration of Coaxially Wound Coils>

As illustrated in FIG. 4, the first U-phase coil 20Ua and the second U-phase coil 20Ub are formed by being wound in directions opposite to each other. In addition, the third U-phase coil 20Uc and the fourth U-phase coil 20Ud are formed by being wound in directions opposite to each other. The first U-phase coil 20Ua and the third U-phase coil 20Uc are examples of the "first coaxially wound coil." In addition, the second U-phase coil 20Ub and the fourth U-phase coil 20Ud are examples of the "second coaxially wound coil."

Specifically, as illustrated in FIG. 9, the first U-phase coil 20Ua and the third U-phase coil 20Uc are formed by winding the conductor 20a counterclockwise as seen from the radially inner side. As illustrated in FIG. 10, the second U-phase coil 20Ub and the fourth U-phase coil 20Ud are formed by winding the conductor 20a clockwise as seen from the radially inner side.

Here, among the plurality of coils 20, the coil 20 which is the power source portion-side coil 20p and in which the conductor 20a is wound counterclockwise is defined as a first coaxially wound coil 24a, the coil 20 which is the neutral point-side coil 20n and in which the conductor 20a is wound clockwise is defined as a second coaxially wound coil 24b, the coil 20 which is the neutral point-side coil 20n and in which the conductor 20a is wound counterclockwise is defined as a third coaxially wound coil 24c, and the coil 20 which is the power source portion-side coil 20p and in which the conductor 20a is wound clockwise is defined as a fourth coaxially wound coil 24d. The first coaxially wound coil 24a and the third coaxially wound coil 24c are examples of the "first coaxially wound coil." In addition, the second coaxially wound coil 24b and the fourth coaxially wound coil 24d are examples of the "second coaxially wound coil."

Figure 9A:
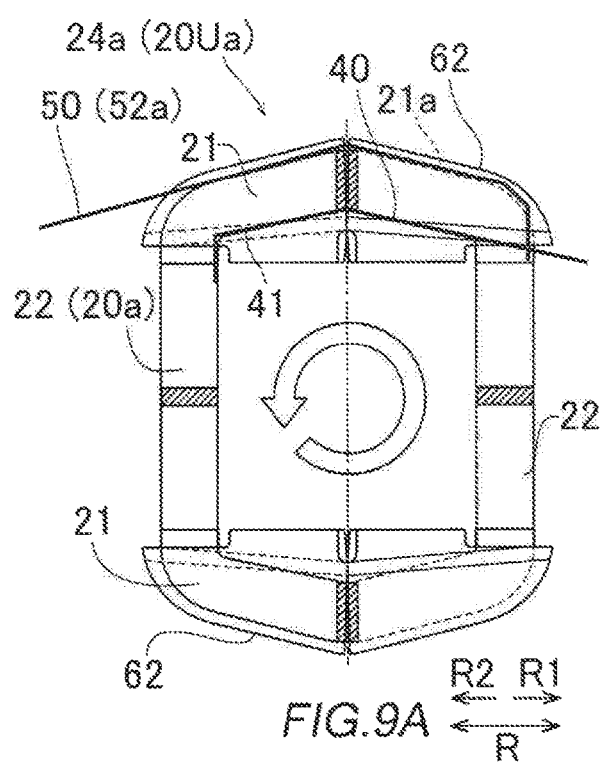
FIGS. 9A and 9B illustrate the winding direction of the first coaxially wound coil (FIG. 9A) and a third coaxially wound coil (FIG. 9B) according to the embodiment of the present disclosure.

In the first coaxially wound coil 24a (first U-phase coil 20Ua), as illustrated in FIG. 9A, the lead wire portion 40 (root portion 41) serving as the winding start point is disposed on the innermost peripheral side of winding, and the neutral point-side wire portion 50 (distant pole wire portion 52a) serving as the winding end point is disposed on the outermost peripheral side of winding. In this state, the draw-out portion 42 is shaped so as to project along the Z direction toward the axially outer side with respect to the coil end portion 21, so as to intersect the coil end portion 21 of the coil 20 of the draw-out portion 42 itself in the same-phase region A1, thereby forming the coil 20 illustrated in FIG. 5. In addition, the root portion 41 of the lead wire portion 40 of the first coaxially wound coil 24a is connected to the slot housed portion 22 which is disposed in the radially outer slot 13b (see FIG. 4). The end portion 41a of the root portion 41 on the power source portion side (winding start point side) is disposed on the radially inner side with respect to the slot housed portion 22 and on the axially lower side (stator core 10 side) of the coil end portion 21.

In the first embodiment, in addition, the neutral point-side wire portion 50 (distant pole wire portion 52a), which is a portion of the first coaxially wound coil 24a on the winding end side, is drawn out from the radially outer side (the arrow R2 direction side). Particularly, the neutral point-side wire portion 50 of the first coaxially wound coil 24a is connected to the slot housed portion 22 which is disposed in the radially inner slot 13a (on the arrow R1 direction side), and disposed on the winding outer peripheral side of the coil end portion 21. The distant pole wire portion 52 is routed to the radially outer side of the coil end portion 21. As illustrated in FIG. 5, the distant pole wire portion 52 is drawn out in the direction of the arrow Z1.

Figure 9B:
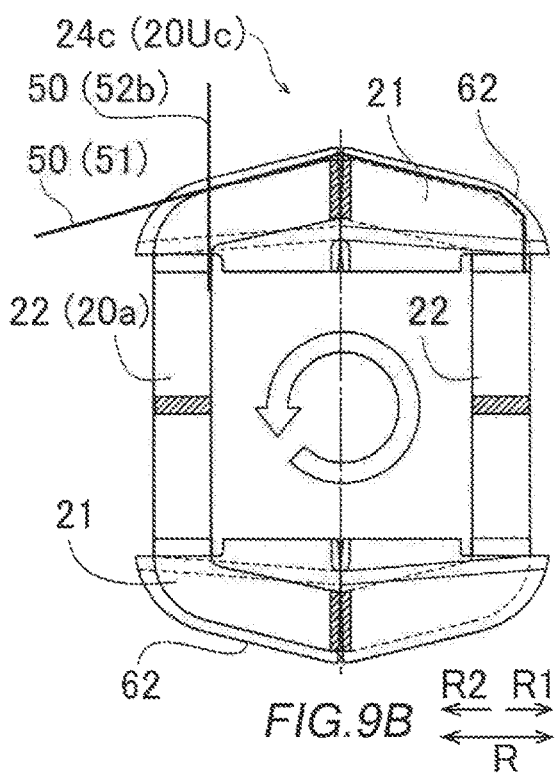

In the third coaxially wound coil 24c, as illustrated in FIG. 9B, the distant pole wire portion 52b as the winding start point is disposed on the innermost peripheral side of winding, and the neutral point connection wire portion 51 as the winding end point is disposed on the outermost peripheral side of winding. The distant pole wire portion 52b of the third coaxially wound coil 24c is connected to the slot housed portion 22 which is disposed in the radially outer slot 13b, and drawn out from the radially outer side toward the axially outer side of the coil end portion 21. In addition, the neutral point connection wire portion 51 of the third coaxially wound coil 24c is connected to the slot housed portion 22 which is disposed in the radially inner slot 13a, and routed toward the radially outer slot 13b via the winding outer peripheral side of the coil end portion 21. The neutral point connection wire portion 51 of the third coaxially wound coil 24c is drawn out from the radially outer side toward the axially outer side of the coil end portion 21. Consequently, the third coaxially wound coil 24c illustrated in FIG. 11 is formed.

As illustrated in FIG. 8, the distant pole wire portion 52b of the third U-phase coil 20Uc is connected to a distant pole wiring terminal 32b of the distant pole wiring member 32. In addition, the neutral point connection wire portion 51 of the third U-phase coil 20Uc is connected to a neutral point connection terminal 31e of the lead wire portion holding member 31.

As illustrated in FIG. 12A, the distant pole wire portion 52 and the neutral point connection wire portion 51 of the second coaxially wound coil 24b are each drawn out from the radially outer side of the coil end portion 21. As illustrated in FIG. 12B, in addition, the distant pole wire portion 52a of the fourth coaxially wound coil 24d is drawn out from the radially outer side. That is, in the first embodiment, the distant pole wire portions 52a and 52b and the neutral point connection wire portion 51 of the coil 20 are all drawn out from the radially outer side toward the wiring holding member 30. As illustrated in FIG. 8, the neutral point connection wire portion 51 is connected to the neutral point connection terminal 31e.

Figure 10A:
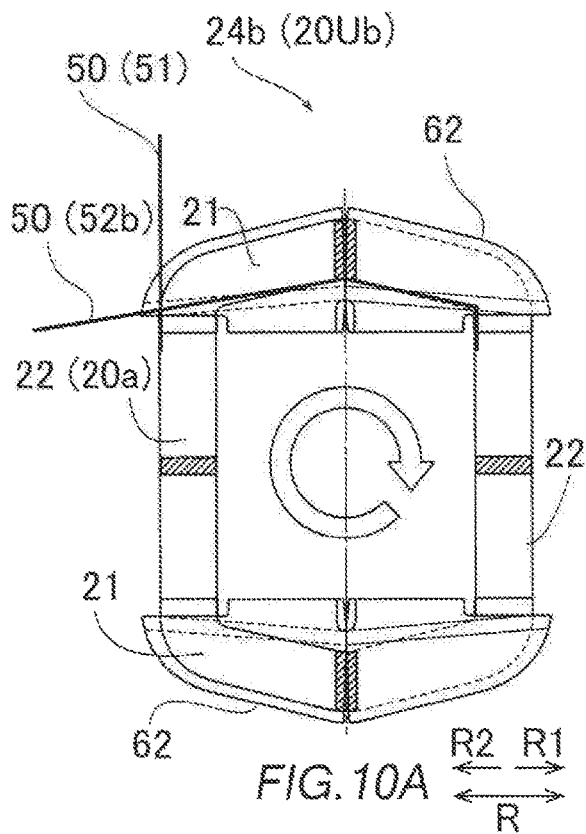
FIGS. 10A and 10B illustrate the winding direction of a second coaxially wound coil (FIG. 10A) and a fourth coaxially wound coil (FIG. 10B) according to the embodiment of the present disclosure.

Particularly, as illustrated in FIG. 10A, the distant pole wire portion 52b of the second coaxially wound coil 24b is connected to the slot housed portion 22 which is disposed in the radially inner slot 13a, and routed toward the radially outer slot 13b via the inner peripheral side of the coil end portion 21. In addition, the neutral point connection wire portion 51 of the second coaxially wound coil 24b is connected to the slot housed portion 22 which is disposed in the radially outer slot 13b. The distant pole wire portion 52b and the neutral point connection wire portion 51 are drawn out from the radially outer side toward the axially outer side of the coil end portion 21. Consequently, the second coaxially wound coil 24b illustrated in FIG. 12A is formed.

Figure 10B:
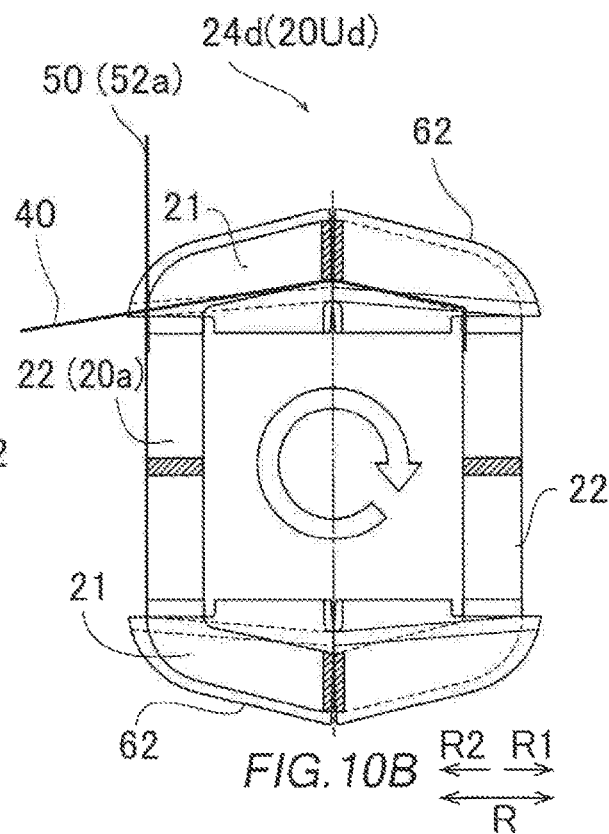

As illustrated in FIG. 10B, the lead wire portion 40 of the fourth coaxially wound coil 24d is connected to the slot housed portion 22 which is disposed in the radially inner slot 13a, and routed toward the radially outer slot 13b via the inner peripheral side of the coil end portion 21. In addition, the distant pole wire portion 52a of the fourth coaxially wound coil 24d is connected to the slot housed portion 22 which is disposed in the radially outer slot 13b. The lead wire portion 40 and the distant pole wire portion 52a are drawn out toward the axially outer side of the coil end portion 21, as in the first coaxially wound coil 24a. Consequently, the fourth coaxially wound coil 24d illustrated in FIG. 12B is formed.

(Configuration of Wiring Holding Member)

As illustrated in FIG. 8, the wiring holding member 30 includes the lead wire portion holding member 31 and the distant pole wiring member 32. The lead wire portion holding member 31 is configured to hold the lead wire portion 40 of the coil 20 and the neutral point connection wire portion 51, of the neutral point-side wire portion 50. In addition, the distant pole wiring member 32 is configured to hold the distant pole wire portions 52a and 52b, of the neutral point-side wire portion 50 of the coil 20.

The wiring holding member 30 is provided on the outer side (e.g. the arrow Z1 direction side) in the direction of the center axis C1 of the coil end portion 21 of the coil 20. The wiring holding member 30 is formed from a resin (an insulating material), for example. In addition, a spacer 34 is provided between the wiring holding member 30 and the coil end portion 21, and the wiring holding member 30 and the coil end portion 21 are disposed with a gap therebetween.

<Configuration of Lead Wire Portion Holding Member>

Figure 13:
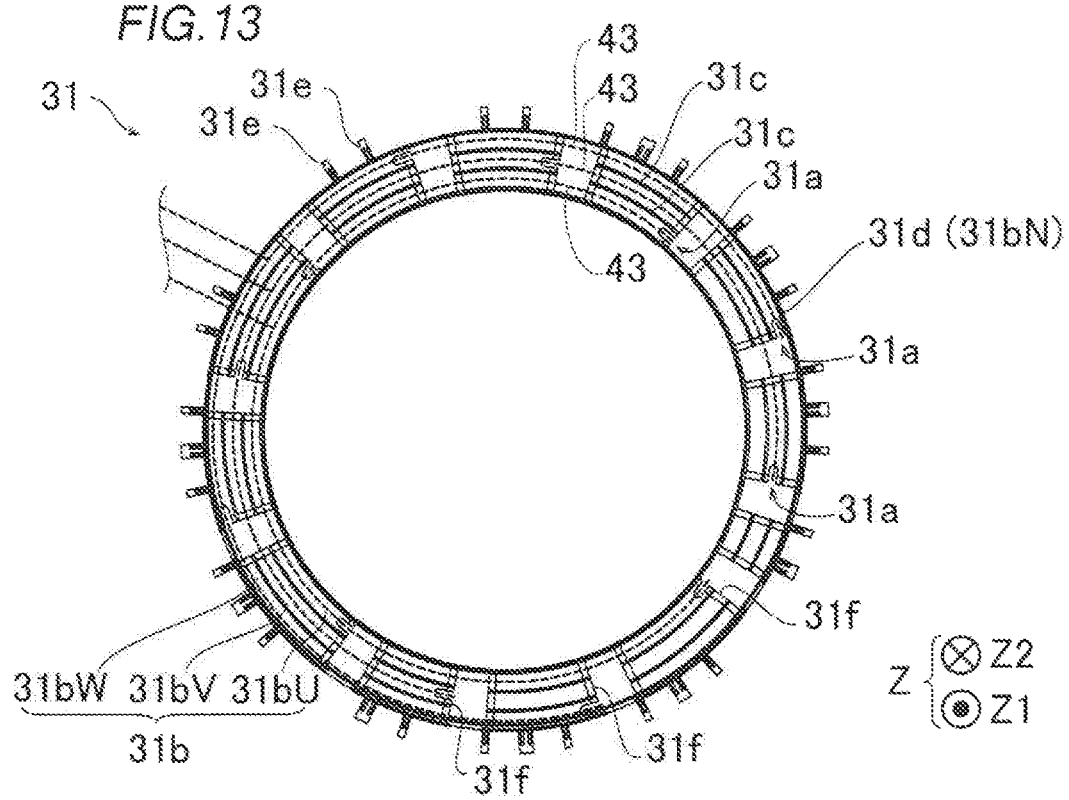
FIG. 13 is a plan view illustrating the configuration of a lead wire portion holding member according to the embodiment of the present disclosure.

As illustrated in FIG. 13, the lead wire portion holding member 31 includes a plurality of (three) lead wire portion wiring regions 31b in which the respective routed portions 43 of the lead wire portions 40 for a plurality of phases (e.g. three phases) are disposed. That is, the wiring holding member 30 includes a lead wire portion wiring region 31bU in which the lead wire portion 40 of the U-phase coil 20U is disposed, a lead wire portion wiring region 31bV in which the lead wire portion 40 of the V-phase coil 20V is disposed, and a lead wire portion wiring region 31bW in which the lead wire portion 40 of the W-phase coil 20W is disposed. The lead wire portion wiring regions 31b are examples of the "holding portion."

The lead wire portion wiring regions 31bU, 31bV, and 31bW have an arcuate shape (a concentric circle shape) as seen in the axial direction. For example, the lead wire portion wiring region 31bU, the lead wire portion wiring region 31bV, and the lead wire portion wiring region 31bW are disposed in this order from the radially inner side. The bottom portions of the lead wire portion wiring region 31bU, the lead wire portion wiring region 31bV, and the lead wire portion wiring region 31bW are preferably formed in a mesh shape to enable passage of cooling oil.

Here, in the first embodiment, the lead wire portion holding member 31 are provided with the take-in ports 31a, each of which guides the end portion 42a of the draw-out portion 42 on the power source portion 200 side to the lead wire portion wiring region 31bU, 31bV, and 31bW, for the corresponding lead wire portion wiring region 31bU, 31bV, and 31bW. The take-in port 31a is formed so as to have an arcuate notch shape, for example. In addition, the lead wire portion holding member 31 is provided with opening portions 31f that are each formed to be continuous with the take-in port 31a to open over the lead wire portion wiring regions 31bU, 31bV, and 31bW.

As illustrated in FIG. 8, the lead wire portion wiring regions 31b are separated from each other by wall portions 31c that extend in the Z direction, which secures the interphase insulation performance between the lead wire portions 40 (routed portions 43). As illustrated in FIG. 13, in addition, the wall portions 33 are formed in an arcuate shape so as to extend along the lead wire portion wiring regions 31b as seen in the axial direction.

In the first embodiment, in addition, the lead wire portion holding member 31 includes a neutral wire wiring region 31bN which is separated from the lead wire portion wiring regions 31b and in which a neutral point bus member 31d is disposed. In addition, the lead wire portion holding member 31 is provided with the neutral point connection terminals 31e which are connected to the neutral point bus member 31d and to which the neutral point connection wire portions 51 which extend from the coils 20 are connected. The neutral point connection terminals 31e are formed so as to project radially outward from the lead wire portion holding member 31.

<Configuration of Distant Pole Wiring Member>

Figure 14:
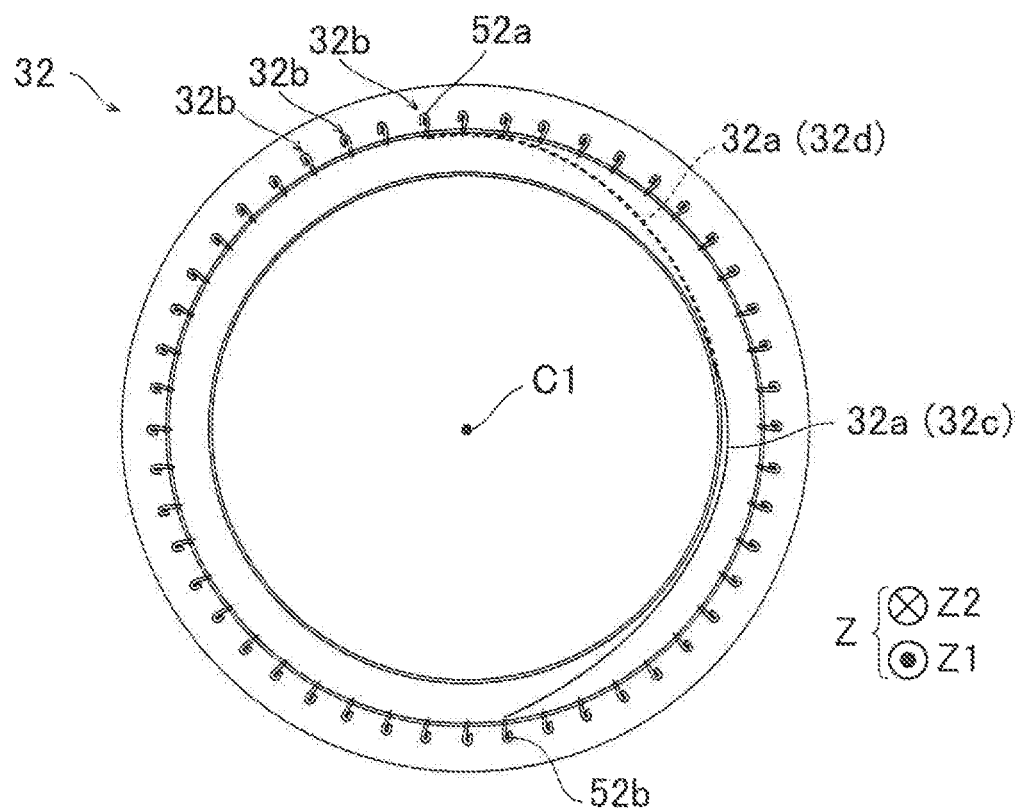
FIG. 14 is a plan view illustrating the configuration of a distant pole wiring member according to the embodiment of the present disclosure.

As illustrated in FIG. 14, the distant pole wiring member 32 is disposed (placed) on the arrow Z1 direction side of the lead wire portion holding member 31. The distant pole wiring member 32 includes the connection wiring portion 32a. The connection wiring portion 32a is coated with an insulating film (not illustrated). Specifically, the connection wiring portion 32a is provided with U-phase wiring, V-phase wiring, and W-phase wiring, and each wiring is coated with the insulating film. The U-phase wiring, the V-phase wiring, and the W-phase wiring are formed from copper. In FIG. 14, only one connection wiring portion 32a, of the plurality of connection wiring portions 32a, is illustrated for description, and the other connection wiring portions 32a are not illustrated.

In addition, the distant pole wiring member 32 includes the distant pole wiring terminals 32b which are provided at (connected to) the end portions of the connection wiring portion 32a. The distant pole wiring terminals 32b are configured to be engageable with (connectable to) the distant pole wire portions 52a and 52b which are drawn out from the coil end portion 21. The distant pole wiring terminals 32b are provided so as to project radially outward from distant pole wiring member 32.

The distant pole wiring member 32 has an arcuate shape. In addition, as illustrated in FIG. 8, the connection wiring portions 32a of the distant pole wiring member 32 each include an upper level portion 32c and a lower level portion 32d provided in two levels in the Z direction. Specifically, as illustrated in FIG. 14, for example, a portion of the connection wiring portion 32a on the distant pole wire portion 52a side is disposed in an arcuate shape in the lower level portion 32d on the arrow Z2 direction side to extend from the radially outer side toward the radially inner side, and a portion of the connection wiring portion 32a on the distant pole wire portion 52b side is disposed in an arcuate shape in the upper level portion 32c on the arrow Z1 direction side to extend from the radially inner side toward the radially outer side.

(Method of Manufacturing Stator Coils)

Next, a method of manufacturing the stator 100 according to the first embodiment will be described with reference to FIGS. 1, 5, and 7 to 12.

<Process of Forming Coils>

First, as illustrated in FIG. 9A, the conductor 20a is wound counterclockwise around a winding frame (not illustrated) with the winding start point disposed on the side on which the slot housed portion 22 to be disposed on the radially inner side is to be formed. Preferably, the conductor 20a is wound with the interphase insulating paper 62 attached to the winding frame in advance. Consequently, the root portion 41 of the lead wire portion 40, which is a portion of the conductor 20a of the first coaxially wound coil 24a on the one end side, is wound on the inner side (innermost periphery) with respect to the outermost periphery of the coil end portion 21 of the coil 20 of the root portion 41 itself. The neutral point-side wire portion 50 (distant pole wire portion 52a), which is a portion of the conductor 20a of the first coaxially wound coil 24a on the other end side, is wound at the outermost periphery of the coil end portion 21, and the winding end point is disposed on the radially outer side with respect to the coil end portion 21. The draw-out portion 42 and the distant pole wire portion 52a of the lead wire portion 40 are shaped so as to project toward the outer side with respect to the coil end portion, thereby forming the first coaxially wound coil 24a illustrated in FIG. 5.

As illustrated in FIG. 10, the conductor 20a is wound clockwise around the winding frame with the winding start point disposed on the side on which the slot housed portion 22 to be disposed on the radially outer side is to be formed. Consequently, the distant pole wire portion 52a, which is a portion of the conductor 20a of the second coaxially wound coil 24b on the one end side, is wound on the inner side (innermost periphery) with respect to the outermost periphery of the coil end portion 21 of the coil 20 of the distant pole wire portion 52a itself. The neutral point connection wire portion 51, which is a portion (winding end portion) of the conductor 20a of the second coaxially wound coil 24b on the other end side, projects in the axial direction from the slot housed portion 22 on the radially outer side. The distant pole wire portion 52a is shaped so as to project toward the outer side with respect to the coil end portion 21, thereby forming the second coaxially wound coil 24b illustrated in FIG. 12A.

As illustrated in FIG. 9B, in addition, the conductor 20a is wound counterclockwise around the winding frame with the winding start point disposed on the side on which the slot housed portion 22 to be disposed on the radially outer side is to be formed. Consequently, the distant pole wire portion 52b, which is a portion of the conductor 20a of the third coaxially wound coil 24c on the one end side, is formed so as to project in the axial direction from the slot housed portion 22 on the radially outer side. In addition, the neutral point connection wire portion 51, which is a portion of the conductor 20a of the third coaxially wound coil 24c on the other end side, is wound at the outermost periphery of the coil end portion 21, and the winding end point is disposed on the radially outer side with respect to the coil end portion 21. The neutral point connection wire portion 51 and the distant pole wire portion 52a are shaped so as to project toward the outer side with respect to the coil end portion 21, thereby forming the third coaxially wound coil 24c illustrated in FIG. 11.

As illustrated in FIG. 10B, the conductor 20a is wound clockwise around the winding frame with the winding start point disposed on the side on which the slot housed portion 22 to be disposed on the radially outer side is to be formed. Consequently, the root portion 41 of the lead wire portion 40, which is a portion of the conductor 20a of the fourth coaxially wound coil 24d on the one end side, is wound on the inner side (innermost periphery) with respect to the outermost periphery of the coil end portion 21 of the coil 20 of the root portion 41 itself. The neutral point-side wire portion 50 (distant pole wire portion 52a), which is a portion (winding end portion) of the conductor 20a of the fourth coaxially wound coil 24d on the other end side, projects in the axial direction from the slot housed portion 22 on the radially outer side. The draw-out portion 42 of the lead wire portion 40 is shaped so as to project toward the outer side with respect to the coil end portion 21, thereby forming the fourth coaxially wound coil 24d illustrated in FIG. 12B.

<Other Processes>

The coils 20 are inserted into the slots 13 of the stator core 10. For example, after one of the slot housed portions 22 is inserted in the axial direction into the radially outer slot 13b, the other slot housed portion 22 is inserted into the radially inner slot 13a, which is located away from the radially outer slot 13b in the circumferential direction, from the radially inner side. The slot housed portions 22 are disposed in the slots 13 with the slot insulating paper 61 disposed between the slot housed portions 22 and the slots 13.

In this state, the root portion 41 of the lead wire portion 40 is connected to the slot housed portion 22, and disposed in the same-phase region A1 which overlaps the coil end portion 21 of the coil 20 of the same phase (of the root portion 41 itself) as seen in the direction of the center axis C1 (see FIG. 7). In addition, the draw-out portion 42 of the lead wire portion 40 is drawn out so as to project in the direction of the center axis C1 from the end portion 41a of the root portion 41 on the power source portion 200 side toward the axially outer side with respect to the coil end portion 21, so as to intersect the coil end portion 21 via the boundary portion 23 in the same-phase region A1.

As illustrated in FIGS. 7 and 8, the lead wire portion holding member 31 of the wiring holding member 30 is disposed on the arrow Z1 direction side of the coil end portion 21, the draw-out portions 42 are disposed in the respective take-in ports 31a, and the routed portions 43 are disposed in the respective lead wire portion wiring regions 31b. In addition, the neutral point connection wire portions 51 are connected to the neutral point connection terminals 31e of the lead wire portion holding member 31. The distant pole wiring member 32 of the wiring holding member 30 is disposed on the arrow Z1 direction side of the lead wire portion holding member 31, and the distant pole wire portions 52a and 52b are connected to the respective distant pole wiring terminals 32b. After that, the stator 100 is completed.

[Effects of Present Embodiment]

The following effects can be obtained with the present embodiment.

In the present embodiment, the root portion (41) of the lead wire portion (40) is connected to the slot housed portion (22), and disposed in the same-phase region (A1) which overlaps the coil end portion (21) of the coil (20) of the same phase as seen in the center axis (C1) direction, and the draw-out portion (42) of the lead wire portion (40) is disposed so as to project in the center axis (C1) direction from the power source portion-side end portion (41a) of the root portion (41) toward the axially outer side with respect to the coil end portion (21) in the same-phase region (A1). Consequently, the lead wire portion (40) can be routed at a position overlapping the coil end portion (21) of the coil (20) of the same phase from the root portion (41) to the draw-out portion (42) of the lead wire portion (40). Thus, the lead wire portion (40) can be routed so as not to contact coils (20) (coil end portions (21)) of different phases even in the case where the lead wire portion (40) is routed to a desired position (on the outer side of the coil end portion (21)). As a result, the interphase insulation performance of the lead wire portions (40) can be secured without providing an insulating tube and without increasing the thickness of the insulation coating of the conductor (20a). As a result, it is no longer necessary to provide the lead wire portion (40) with an insulating tube. Thus, it is possible to prevent an increase in the number of man-hours for manufacture of the stator (100), and to prevent an increase in the length of the coil end portions (21) in the axial direction (Z), while securing the interphase insulation performance of the lead wire portions (40).

Here, it is conceivable to increase the thickness of the insulation coating of each coil, in order to secure insulation performance without providing an insulating tube. In the case where the thickness of the insulation coating is increased, however, not only the coil end portions but also the coating in the slots of the stator core is increased, which is considered to reduce the coil space factor. In this respect, with the configuration of the embodiment described above, it is not necessary to increase the thickness of the insulation coating of the conductor (20a), which prevents a reduction in the coil space factor in the slots (13).

In the present embodiment, in addition, the root portion (41) is disposed on an inner peripheral side with respect to an outermost conductor (20a) of the coil end portion (21) of the coil (20) of the same phase which is wound to have the slot housed portion (22) and the coil end portion (21); and the draw-out portion (42) is disposed so as to project in the center axis (C1) direction from the power source portion-side end portion (41a) of the root portion (41) toward the axially outer side with respect to the coil end portion (21) in the same-phase region (A1), so as to intersect the coil end portion (21) of the coil (20) of the same phase. With such a configuration, the power source portion-side end portion (41a) of the root portion (41) can be disposed at a desired radial position and a desired circumferential position (e.g. the radial position and the circumferential position of the take-in port (31a)) of the wiring holding member (31) with the root portion (41) routed inside the coil end portion (21) of the coil (20) of the same phase. As a result, the draw-out portion (42) can be routed from the desired radial position and the desired circumferential position to a desired position (take-in port (31a)) in the center axis (C1) direction after intersecting the coil end portion (21) along the center axis (C1) direction. Thus, the lead wire portion (40) can be further prevented from contacting the coils (20) of different phases. As a result, the interphase insulation performance of the lead wire portions (40) can be further improved without using an insulating tube etc.

In the present embodiment, in addition, the root portion (41) is disposed on an inner peripheral side with respect to an outermost conductor (20a) of the coil end portion (21) of the coil (20) of the root portion (41) itself which is wound to have the slot housed portion (22) and the coil end portion (21); and the draw-out portion (42) is disposed so as to project in the center axis (C1) direction from the power source portion-side end portion (41a) of the root portion (41) toward the axially outer side with respect to the coil end portion (21) in the same-phase region (A1), so as to intersect the coil end portion (21) of the coil (20) of the draw-out portion (42) itself. Here, it is considered to be difficult to dispose (insert) the power source portion-side end portion (41a) of the root portion (41), which is temporarily disposed on the outer side of the coil end portion (21), on the inner peripheral side with respect to the outermost periphery of the coil end portion (21) after the plurality of coils (20) are disposed in the stator core (10). That is, it is not easy to insert the lead wire portion (40) into a gap between the adjacent coil end portions (21) or the coil end portions (21). With the configuration of the embodiment described above, in contrast, the power source portion-side end portion (41a) of the root portion (41) can be disposed at the desired radial position and circumferential position by winding the root portion (41) of the lead wire portion (40) on the inner peripheral side with respect to the outermost periphery of the coil end portion (21) of the root portion (41) itself when the coil (20) is wound. As a result, the interphase insulation performance of the lead wire portions (40) can be further improved while preventing complication of the assembly process for the stator (100).

In the present embodiment, in addition, the coils (20) are each disposed adjacent to a different coil (20) of the same phase; and the draw-out portion (42) is disposed so as to project in the center axis (C1) direction from the power source portion-side end portion (41a) of the root portion (41) toward the axially outer side with respect to the coil end portion (21) at a position overlapping the coil end portion (21) of the coil (20) of the draw-out portion (42) itself or the coil end portion (21) of the adjacent coil (20) in the same-phase region (A1) as seen in the center axis (C1) direction. With such a configuration, the lead wire portion (40) can be routed to a desired position while securing the interphase insulation performance of the lead wire portions (40) easily by drawing out the draw-out portion (42) in the same-phase region (A1) in which the coil end portion (21) of the coil (20) of the draw-out portion (42) itself or the coil end portion (21) of the adjacent coil (20) is disposed in the case where the adjacent coil (20) is of the same phase.

In the present embodiment, in addition, the draw-out portion (42) is disposed so as to project in the center axis (C1) direction from the power source portion-side end portion (41a) of the root portion (41) toward the axially outer side with respect to the coil end portion (21) via a boundary portion (23), in a circumferential direction, between the coil end portion (21) of the coil (20) of the draw-out portion (42) itself and the coil end portion (21) of the adjacent coil (20) of the same phase in the same-phase region (A1). With such a configuration, the draw-out portion (42) is routed at the boundary portion (23) between the coil end portions (21) of the same phase. Thus, the lead wire portion (40) can be routed with the circumferential position thereof regulated by the adjacent coil end portions (21) of the same phase and with the interphase insulation performance of the lead wire portions (40) secured, for example.

In the present embodiment, in addition, the lead wire portion (40) includes a routed portion (43) connected to a power source portion-side end portion (42a) of the draw-out portion (42) and routed on the axially outer side in the center axis (C1) direction with respect to the coil end portion (21); and the draw-out portion (42) is disposed in the same-phase region (A1) from the power source portion-side end portion (41a) of the root portion (41) to the power source portion-side end portion (42a) of the draw-out portion (42), which is connected to the routed portion (43), as seen in the center axis (C1) direction. Here, the interphase insulation performance of the routed portions (43) can be secured relatively easily by using a routing member etc. (lead wire portion holding member (31)). For example, the interphase insulation of the routed portions (43) of the plurality of lead wire portions (40) can be secured collectively, unlike the case where an insulating tube is attached to each of the draw-out portions (42). In the embodiment described above, the draw-out portions (42), which extend to the routed portions (43) of which the interphase insulation performance can be secured relatively easily, can be disposed at a position overlapping the coil end portion (21) of the coil (20) of the same phase. Thus, the interphase insulation performance of the lead wire portions (40) can be secured effectively.

In the present embodiment, in addition, the stator (100) further includes a lead wire portion holding member (31) provided on the axially outer side in the center axis (C1) direction with respect to the coil end portion (21) and including a holding portion (31b) that holds the routed portion (43); the lead wire portion holding member (31) includes a guide portion (31a) that guides the power source portion-side end portion (42a) of the draw-out portion (42) to the holding portion (31b); and the guide portion (31a) is disposed at a position overlapping the coil end portion (21) of the same phase as that of the draw-out portion (42) to be guided as seen in the center axis (C1) direction. With such a configuration, the interphase insulation performance of the routed portions (43) is secured in the lead wire portion holding member (31). The guide portion (31a), which introduces the lead wire portion (40) to the lead wire portion holding member (31), is disposed at a position overlapping the coil end portion (21) of the same phase. Thus, the entire draw-out portion (42), which is routed between the root portion (41) and the guide portion (31a), can be disposed at a position overlapping the coil end portion (21) of the same phase. As a result, the interphase insulation performance of the lead wire portions (40) can be further secured.

In the present embodiment, in addition, the coils (20) are coaxially wound coils (24a, 24b, 24c, 24d) each formed by winding a conductor (20a) a plurality of times around a first slot (13), of the plurality of slots (13), and a second slot (13) disposed away from the first slot (13) in a circumferential direction of the stator core (10); the root portion (41) of the lead wire portion (40), which is a portion of the conductor (20a) of the coaxially wound coil (24a, 24b, 24c, 24d) on one end side, is wound on an inner peripheral side with respect to an outermost periphery of the coil end portion (21) of the coaxially wound coil (24a, 24b, 24c, 24d) of the root portion (41) itself; and a neutral point-side wire portion (50), which is a portion of the conductor (20a) of the coaxially wound coil (24a, 24b, 24c, 24d) on the other end side, is drawn out from one side in a radial direction of the stator core (10) in the coaxially wound coil (24a, 24b, 24c, 24d). Here, in the case where the coils (20) which are wound through distributed winding and which are wound coaxially are disposed in the stator core (10), the coil end portions (21) of different phases are adjacent to each other in the radial direction and the circumferential direction. Therefore, the lead wire portion (40) is highly likely to contact the coil end portion (21) of a different phase. With the configuration of the embodiment described above, in contrast, it is particularly effective to apply the present disclosure to a configuration that uses the coaxially wound coil (24a, 24b, 24c, 24d) which are relatively highly likely to contact the coil (20) of a different phase. In addition, the insulation of the neutral point-side wire portion (50), which is a portion of the conductor (20a) of the coaxially wound coil (24a, 24b, 24c, 24d) on the other end side, can be secured using a normal insulation coating, unlike the lead wire portion (40) which is connected to the power source portion (200). In this respect, with the configuration of the embodiment described above, it is possible to prevent complication of the configuration of the coils (20) and the stator (100) by drawing out the neutral point-side wire portion (50) from the one side in the radial direction of the stator core (10) in the coaxially wound coil (24a, 24b, 24c, 24d).

In the present embodiment, in addition, the coaxially wound coils (24a, 24b, 24c, 24d) include first coaxially wound coils (24a, 24c) and second coaxially wound coils (24b, 24d) wound in a direction opposite to a direction in which the first coaxially wound coils (24a, 24c) are wound; and the neutral point-side wire portion (50) of each of the first coaxially wound coils (24a, 24c) and the second coaxially wound coils (24b, 24d) is drawn out from the one side in the radial direction. With such a configuration, the neutral point-side wire portion (50) can be drawn out from the one side in the radial direction even in the case where the stator (100) is provided with the coaxially wound coils (24a, 24b, 24c, 24d) which are wound in directions opposite to each other. Thus, the configuration of the stator (100) can be simplified compared to a case where the neutral point-side wire portion (50) is drawn out from both sides in the radial direction.

In the present embodiment, in addition, the neutral point-side wire portion (50) is drawn out from a radially outer side of the stator core (10). Here, the space on the radially inner side of the stator core (10) is relatively small, and thus workability is reduced in the case where the neutral point-side wire portion (50) is processed in the space on the radially inner side of the stator core (10). With the configuration of the embodiment described above, in contrast, the neutral point-side wire portion (50) can be processed in the space on the radially outer side of the stator core (10) with a relatively large working space. Thus, the workability and the working efficiency of the assembly work for the stator (100) can be improved.

In the present embodiment, in addition, the coils (20) are two-layer distributed wound coils each disposed over a plurality of teeth (12) that constitute the slots (13), disposed together with a different coil (20) in the same slot (13), and disposed adjacent to the different coil (20) in a radial direction. With such a configuration, the present disclosure can be applied even in the case where the two-layer distributed wound coils, in which the coils (20) of different phases tend to be proximate to each other compared to concentrated wound coils, are used. Thus, it is possible to prevent an increase in the number of man-hours for manufacture of the stator (100), and to prevent an increase in the length of the coil end portions (21) in the axial direction, while securing the interphase insulation performance of the lead wire portions (40) more effectively.

[Modifications]

The embodiment disclosed herein should be considered as exemplary and non-limiting in all respects.

(First Modification)

For example, in the embodiment described above, the stator is provided with the lead wire portion holding member which holds the routed portion of the lead wire portion and the distant pole wiring member. However, the present disclosure is not limited thereto. For example, a lead wire portion 340 may not be provided with the routed portion, and may be provided with a routing panel 330 that has connection terminals 331a to which a draw-out portion 342 is to be connected, as in a stator 300 according to a first modification illustrated in FIG. 15.

In the embodiment described above, the root portion is configured to project toward the outer side with respect to the coil end portion via the boundary portion between two adjacent coil end portions. However, the present disclosure is not limited thereto. For example, the draw-out portion 342 may be configured to project from a coil end portion 321 (same-phase region A2) of the draw-out portion 342 itself toward the axially outer side with respect to the coil end portion 321, as in the stator 300 according to the first modification illustrated in FIG. 16.

Figure 15:
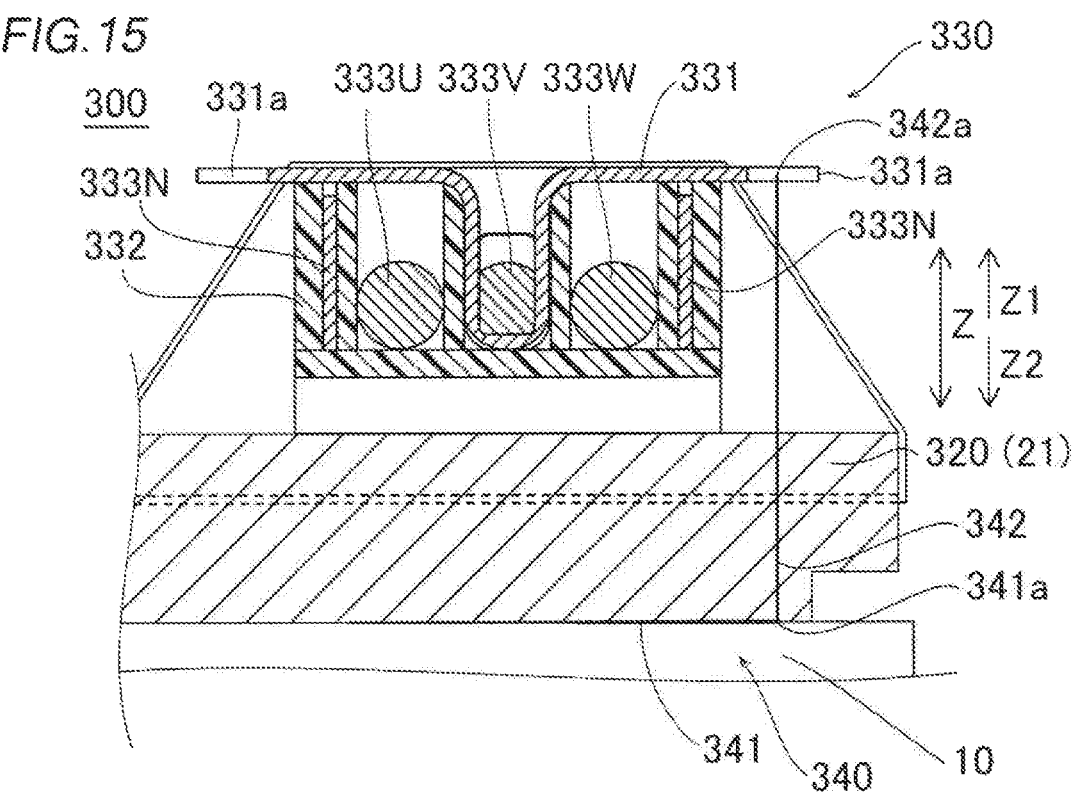
FIG. 15 is a sectional view illustrating the configuration of a stator (wiring holding member) according to a first modification of the embodiment of the present disclosure.
Figure 16:
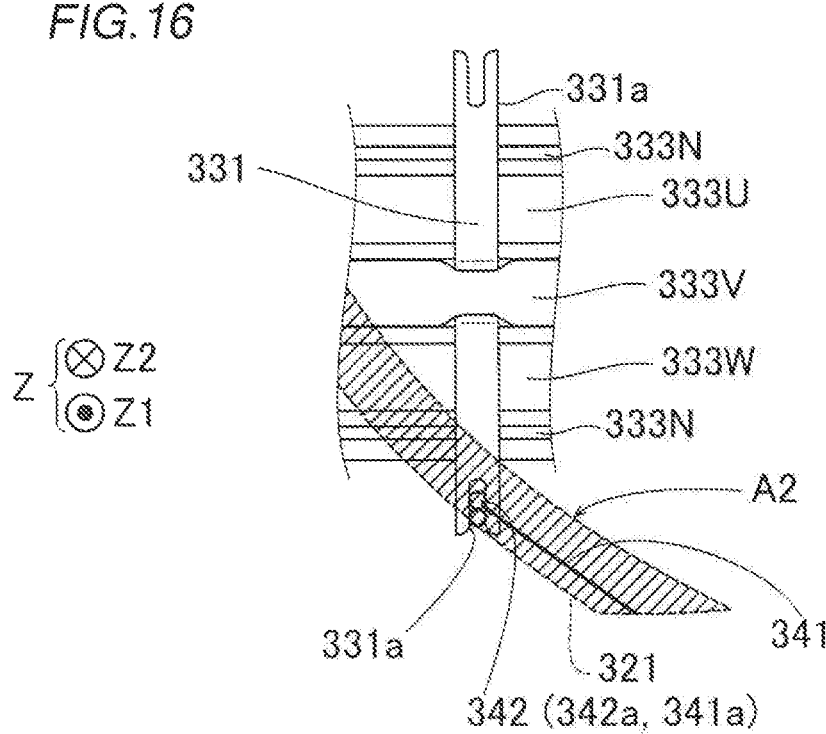
FIG. 16 is a plan view illustrating the configuration of a lead wire portion and the wiring holding member according to the first modification of the embodiment of the present disclosure.

Here, as illustrated in FIGS. 15 and 16, the stator 300 according to the first modification includes coils 320 and routing panels 330. The lead wire portion 340 of each of the coils 320 includes a root portion 341 and the draw-out portion 342. The routing panels 330 each include a connection member 331 that has the connection terminals 331a. In addition, a routing panel body 332 is provided with routing members (a U-phase routing member 333U, a V-phase routing member 333V, a W-phase routing member 333W, and a neutral point bus member 333N). The connection member 331 is provided with the U-phase routing member 333U, the V-phase routing member 333V, the W-phase routing member 333W, and the neutral point bus member 333N. The routing members are connected to the power source portion via a power source terminal etc.

The connection member 331 is formed so as to project toward both sides in the radial direction from the routing panel body 332. An end portion 342a of the draw-out portion 342 is connected to the connection terminal 331a of the connection member 331. The connection member 331 is configured to make the lead wire portion 340 and the routing members continuous with each other. As illustrated in FIG. 16, the draw-out portion 342 is disposed so as to project from an end portion 341a of the root portion 341 toward the outer side with respect to the coil end portion 321 along the center axis direction at a position overlapping the coil end portion 321 of the coil 320 of the same phase as seen in the center axis direction.

(Second Modification)

In the embodiment described above, the neutral point-side wire portion is drawn out from the radially outer side of the stator core. However, the present disclosure is not limited thereto. For example, the neutral point-side wire portion (neutral point connection wire portion 451) may be drawn out from both sides in the radial direction of the stator core 10, or may be drawn out from only the radially inner side of the stator core 10, as in a stator 400 according to a second modification illustrated in FIG. 17.

In the embodiment described above, the root portion is disposed at the innermost periphery of the coil end portion. However, the present disclosure is not limited thereto. That is, it is only necessary that the root portion should be disposed on the inner side with respect to the outermost periphery of the coil end portion. For example, a root portion 441 may be routed on the inner peripheral side with respect to the outermost periphery of the coil end portion 21 and on the outer side with respect to the innermost periphery thereof, as in the stator 400 according to the second modification illustrated in FIG. 17.

Here, as illustrated in FIG. 17, the stator 400 according to the second modification includes coils 420 that each include a lead wire portion 440 and a neutral point connection wire portion 451 and a wiring holding member 430. The lead wire portion 440 includes the root portion 441 and a draw-out portion 442. A lead wire portion holding member 431 of the wiring holding member 430 is provided with a connection terminal 431e that projects toward the radially inner side. The neutral point connection wire portion 451 is drawn out from the radially inner side, and connected to the connection terminal 431e. In addition, the root portion 441 is routed on the inner peripheral side with respect to the outermost periphery of the coil end portion 21 and on the outer peripheral side with respect to the innermost periphery thereof. The draw-out portion 442 is drawn out from an end portion 441a of the root portion 441 to the wiring holding member 430.

In the embodiment described above, coaxially wound coils with different winding directions are provided. However, the present disclosure is not limited thereto. That is, the stator core may be constituted from only coaxially wound coils with the same winding direction.

In the embodiment described above, a round wire is used as the conductor. However, the present disclosure is not limited thereto. That is, a rectangular wire with a rectangular cross section may be used as the conductor.

In the embodiment described above, eight coils are connected in parallel and two groups of such coils are connected in series for each phase, and the coils for the three phases are connected through a Y connection. However, the present disclosure is not limited thereto. That is, eight coils connected in parallel may be connected through a Y connection, rather than being connected in series (through distant pole wiring), and a plurality of coils may be connected through a Δ connection.

In the embodiment described above, the slots of the stator core are open slots as illustrated in FIG. 2. However, the present disclosure is not limited thereto. For example, the stator core may be configured as dividable inner and outer cores, and may be configured to have closed slots when the inner and outer cores are combined with each other.

The invention claimed is:

1. A stator comprising:
a stator core; and
a plurality of coils that each include a coil end portion that projects from an end surface of the stator core in a center axis direction, a slot housed portion disposed in a plurality of slots of the stator core, and a lead wire portion that connects between the slot housed portion and a power source portion, wherein
the lead wire portion includes a root portion connected to the slot housed portion, disposed in a same-phase region which overlaps the coil end portion of the coil of a same phase as seen in the center axis direction, and disposed on an axially inner side of the coil end portion, and a draw-out portion that projects in the center axis direction from a power source portion-side end portion of the root portion toward an axially outer side of the coil end portion in the same-phase region.

2. The stator according to claim 1, wherein:
the root portion is disposed on an inner peripheral side of an outermost conductor of the coil end portion of the coil of the same phase which is wound to have the slot housed portion and the coil end portion; and
the draw-out portion is disposed so as to project in the center axis direction from the power source portion-side end portion of the root portion toward the axially outer side of the coil end portion in the same-phase region, so as to intersect the coil end portion of the coil of the same phase.

3. The stator according to claim 2, wherein:
the root portion is disposed on an inner peripheral side of an outermost conductor of the coil end portion of the coil of the root portion itself which is wound to have the slot housed portion and the coil end portion; and
the draw-out portion is disposed so as to project in the center axis direction from the power source portion-side end portion of the root portion toward the axially outer side of the coil end portion in the same-phase region, so as to intersect the coil end portion of the coil of the draw-out portion itself.

4. The stator according to claim 1, wherein:
the coils are each disposed adjacent to a different coil of the same phase; and
the draw-out portion is disposed so as to project in the center axis direction from the power source portion-side end portion of the root portion toward the axially outer side of the coil end portion at a position overlapping the coil end portion of the coil of the draw-out portion itself or the coil end portion of the adjacent coil in the same-phase region as seen in the center axis direction.

5. The stator according to claim 4 wherein
the draw-out portion is disposed so as to project in the center axis direction from the power source portion-side end portion of the root portion toward the axially outer side of the coil end portion via a boundary portion, in a circumferential direction, between the coil end portion of the coil of the draw-out portion itself and the coil end portion of the adjacent coil of the same phase in the same-phase region.

6. The stator according to claim 1, wherein:
the lead wire portion includes a routed portion connected to a power source portion-side end portion of the draw-out portion and routed on the axially outer side of the coil end portion; and
the draw-out portion is disposed in the same-phase region from the power source portion-side end portion of the root portion to the power source portion-side end portion of the draw-out portion, which is connected to the routed portion, as seen in the center axis direction.

7. The stator according to claim 6, further comprising a lead wire portion holding member provided on the axially outer side of the coil end portion and including a holding portion that holds the routed portion, wherein:

the lead wire portion holding member includes a guide portion that guides the power source portion-side end portion of the draw-out portion to the holding portion; and
the guide portion is disposed at a position overlapping the coil end portion of the same phase as that of the draw-out portion to be guided as seen in the center axis direction.

8. The stator according to claim 1, wherein:
the coils are coaxially wound coils each formed by winding a conductor a plurality of times around a first slot, of the plurality of slots, and a second slot disposed away from the first slot in a circumferential direction of the stator core;
the root portion of the lead wire portion, which is a portion of the conductor of the coaxially wound coil on one end side, is wound on an inner peripheral side of an outermost periphery of the coil end portion of the coaxially wound coil of the root portion itself; and
a neutral point-side wire portion, which is a portion of the conductor of the coaxially wound coil on the other end side, is drawn out from one side in a radial direction of the stator core in the coaxially wound coil.

9. The stator according to claim 8, wherein:
the coaxially wound coils include first coaxially wound coils and second coaxially wound coils wound in a direction opposite to a direction in which the first coaxially wound coils are wound; and
the neutral point-side wire portion of each of the first coaxially wound coils and the second coaxially wound coils is drawn out from the one side in the radial direction.

10. The stator according to claim 8, wherein
the neutral point-side wire portion is drawn out from a radially outer side of the stator core.

11. The stator according to claim 1, wherein
the coils are two-layer distributed wound coils each disposed over a plurality of teeth that constitute the slots, disposed together with a different coil in the same slot, and disposed adjacent to the different coil in a radial direction.

12. A stator coil comprising:
a coil end portion that projects from an end surface of a stator core in a center axis direction;
a slot housed portion disposed in a plurality of slots of the stator core; and
a lead wire portion that connects between the slot housed portion and a power source portion, wherein
the lead wire portion includes a root portion connected to the slot housed portion, disposed in a same-phase region which overlaps the coil end portion of the coil of a same phase as seen in the center axis direction, and disposed on an axially inner side of the coil end portion, and a draw-out portion that projects in the center axis direction from a power source portion-side end portion of the root portion toward an axially outer side of the coil end portion of the coil of the same phase in the same-phase region.

* * * * *